United States Patent [19]

Wernikoff et al.

[11] 3,751,582

[45] Aug. 7, 1973

[54] STORED PROGRAM FACSIMILE CONTROL SYSTEM

[75] Inventors: Robert E. Wernikoff; Joseph M. Van Horn, both of Cambridge, Mass.; Albert E. Mignone, deceased, late of Shaker Heights, Ohio; by Gilda Mignone, executrix, Barrington, R.I.

[73] Assignee: Addressograph Multigraph Corporation, Cleveland, Ohio

[22] Filed: Dec. 8, 1971

[21] Appl. No.: 206,066

[52] U.S. Cl. .......... 178/6, 178/DIG. 4, 178/DIG. 22

[51] Int. Cl. .......... H04n 1/32

[58] Field of Search .......... 178/6, DIG. 4, DIG. 22

[56] References Cited

UNITED STATES PATENTS

| | | | |
|---|---|---|---|
| 3,347,981 | 10/1967 | Kagan | 178/5 |
| 3,558,811 | 1/1971 | Montevecchio | 178/6 |
| 3,084,213 | 4/1963 | Lemelson | 178/DIG. 22 |
| 3,646,256 | 2/1972 | Jacob | 178/6 |
| 3,598,910 | 8/1971 | Johnston | 178/DIG. 4 |
| 3,539,715 | 11/1970 | Lemelson | 178/6 |
| 3,581,000 | 5/1971 | Hansen | 178/6 |
| 3,622,695 | 11/1971 | Rugaber | 178/6 |
| 3,646,257 | 2/1972 | Epstein | 178/6 |

*Primary Examiner*—Howard W. Britton
*Attorney*—Russell L. Root et al.

[57] ABSTRACT

A facsimile transceiver system incorporating a stored program controller. The stored program controller provides operational control of a scanner and a printer mechanism in conjunction with a communication channel for transmitting and receiving facsimile signals and a condition indicator display for presenting transceiver condition information. The scanner and printer are made to operate with a variety of different formats of control and data signals from a remote facsimile system by associating an appropriate program with the controller. This program instructs the controller to process the control and data signals passing through it between the channel, and scanner and printer in a manner that causes the local facsimile system to operate compatibly with other facsimile equipment at the remote end of the communication channel. By readily varying controller operation with different programs, which can be simply associated with the controller, a single facsimile transceiver is operatable with a range of different remote transceivers, operator characteristics and diagnostic checkouts. Improvements in facsimile efficiency are also readily incorporated in existing equipment by providing the improvement through a new program.

20 Claims, 15 Drawing Figures

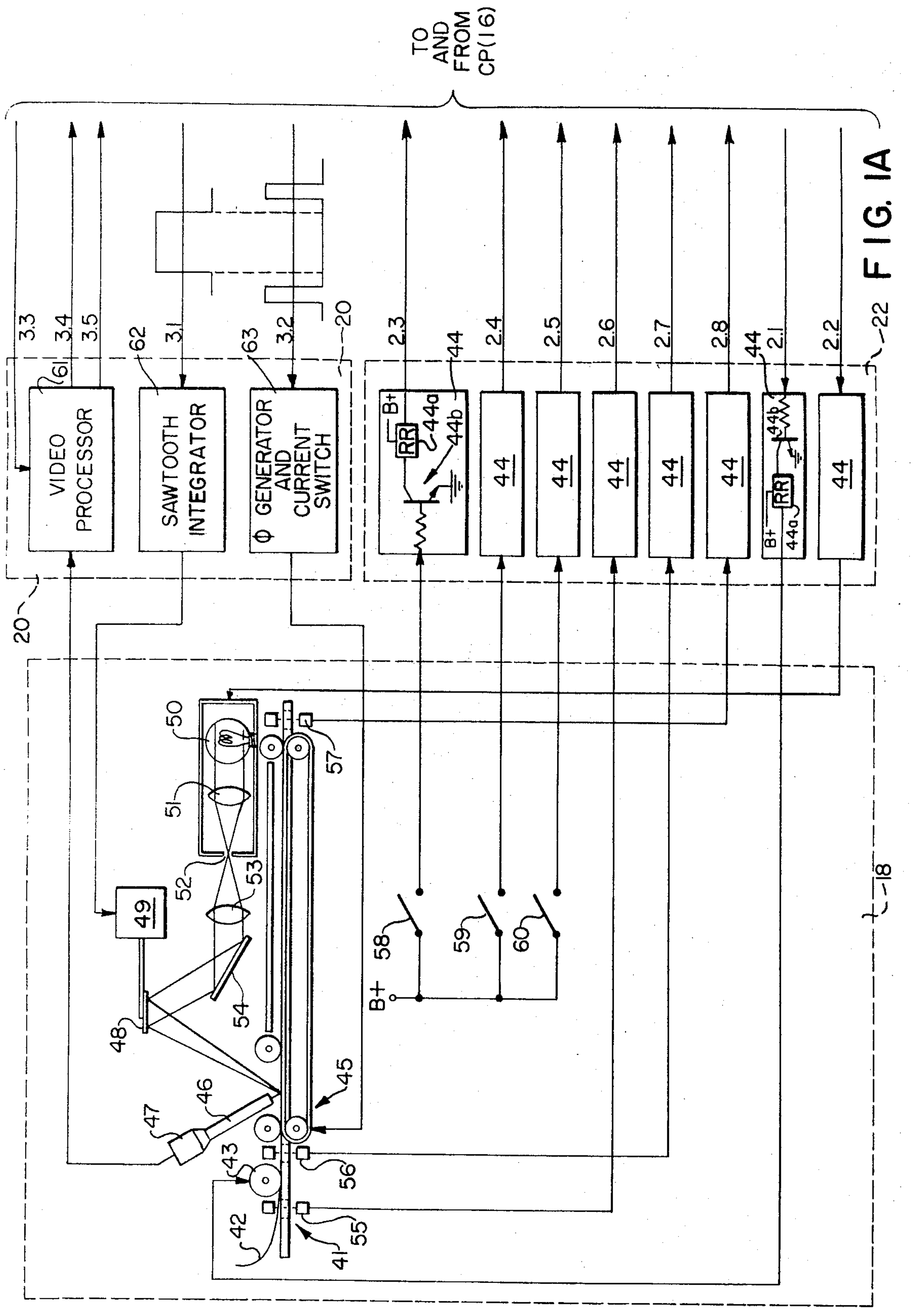
FIG. IA

STORED PROGRAM FACSIMILE CONTROL SYSTEM

FIELD OF THE INVENTION

This invention relates to facsimile transceiver systems and in particular to a facsimile transceiver adaptable for operation in a plurality of modes.

BACKGROUND OF THE INVENTION

In recent years much design and development work in the field of facsimile communication has been focused on reducing document transmission time and on simplifying the task of the facsimile operator. While telephone or similar leased lines are commonly used to provide a facsimile communication channel between separated facsimile transceivers and to take advantage of existing and simple communication facilities, a high degree of sophistication can be designed into a facsimile transceiver to make efficient use of such communication channels. As a result, advances are continuously being made in the technology of facsimile communication. While such advances benefit the efficiency of facsimile transmission between specific stations, it lessens the degree of standardization among the facsimile stations and correspondingly makes it difficult or impossible to achieve the ideal capability where every facsimile station is able to transmit to and receive from every other existing facsimile station, or at least those within a prescribed network of channels.

While sophisticated equipment is more efficient in time, it is also more costly to acquire. Thus there is demand for cheaper, less sophisticated units, where user requirements indicate such units are more economical overall. Also intelligent operator control can be used to improve facsimile operation and efficiency by relying on operators to make decisions best made by humans. As a result facsimile transceivers can be designed to take full advantage of a well trained operator. While this use of a skilled operator makes sense in some applications, it limits the adaptability of facsimile equipment to other areas of facsimile utility where skilled operators often are unavailable.

As specific examples, there are differences in information coding techniques which generally are not compatible. There are also facsimile systems which operate synchronously in various modes, and those which operate asynchronously and thus incompatibly. Added to this are the differences in control and monitor signals exchanged between transceivers during a facsimile communication.

These divergent demands on facsimile operation tend to result in differently operating equipment which are unable to communicate with each other unless of the same design. While one answer to this problem would be standardization of facsimile stations, such standardization would render difficult if not impossible further improvements in the quality and efficiency of facsimile reproduction. On the other hand, the nonstandardization resulting from continuous improvements in and differing demands for facsimile systems drastically limits the numbers of stations to which an individual facsimile system can communicate and further insures a rapid obsolescence of each piece of facsimile equipment.

BRIEF SUMMARY OF THE INVENTION

The present invention, a preferred embodiment, comprises a stored program facsimile controller operative with associated printer, scanner, and communication channel modem to form a facsimile transceiver having the capability, through selection of appropriate programming, to provide facsimile communication with a wide variety of different facsimile stations under the control of operators having varying degrees of skill and training. The particular program applied to the facsimile control system sets the system for data processing of video and control signals according to predetermined information coding and control signal interfacing schemes prescribed by the selected program. In this manner the facsimile transceiver embodying the stored program facsimile control system can be made operative with remote facsimile units having different operation.

In particular, the stored program operation can include one or more of several coding techniques for compressing the raw video signals into more efficiently transmitted digital representations. Additionally, there is provided a diagnostic program operative to check scanner and printer performance along with operation of the coding techniques. Further alternative programming is indicated to accommodate different needs.

By providing a stored program control system with each facsimile transceiver, basic operational units for a facsimile transceiver can be standardized for efficiency of production while improvements and adaptations to other systems can be obtained through the less expensive route of providing stored programs for updating and modifying the control system. A significantly smaller capital investment is required in order to take advantage of the latest sophistications in facsimile communication and in order to add, from time to time, to the number of stations which can be communicated with.

DESCRIPTION OF THE DRAWINGS

These and other features of the invention will be more clearly understood from a reading of the following detailed description of a preferred embodiment presented for purposes of illustration, and not by way of limitation, and to the accompanying drawings of which:

FIGS. 1A–1D indicate circuit and mechanical details of the FIG. 1 system block diagram;

FIGS. 2A–2I are flow charts indicating the operational sequence of the facsimile control system of FIG. 1 as enabled for operation in accordance with one set of programmed instructions;

DETAILED DESCRIPTION OF THE PREFERRED EMBODIMENT

Figure 1:
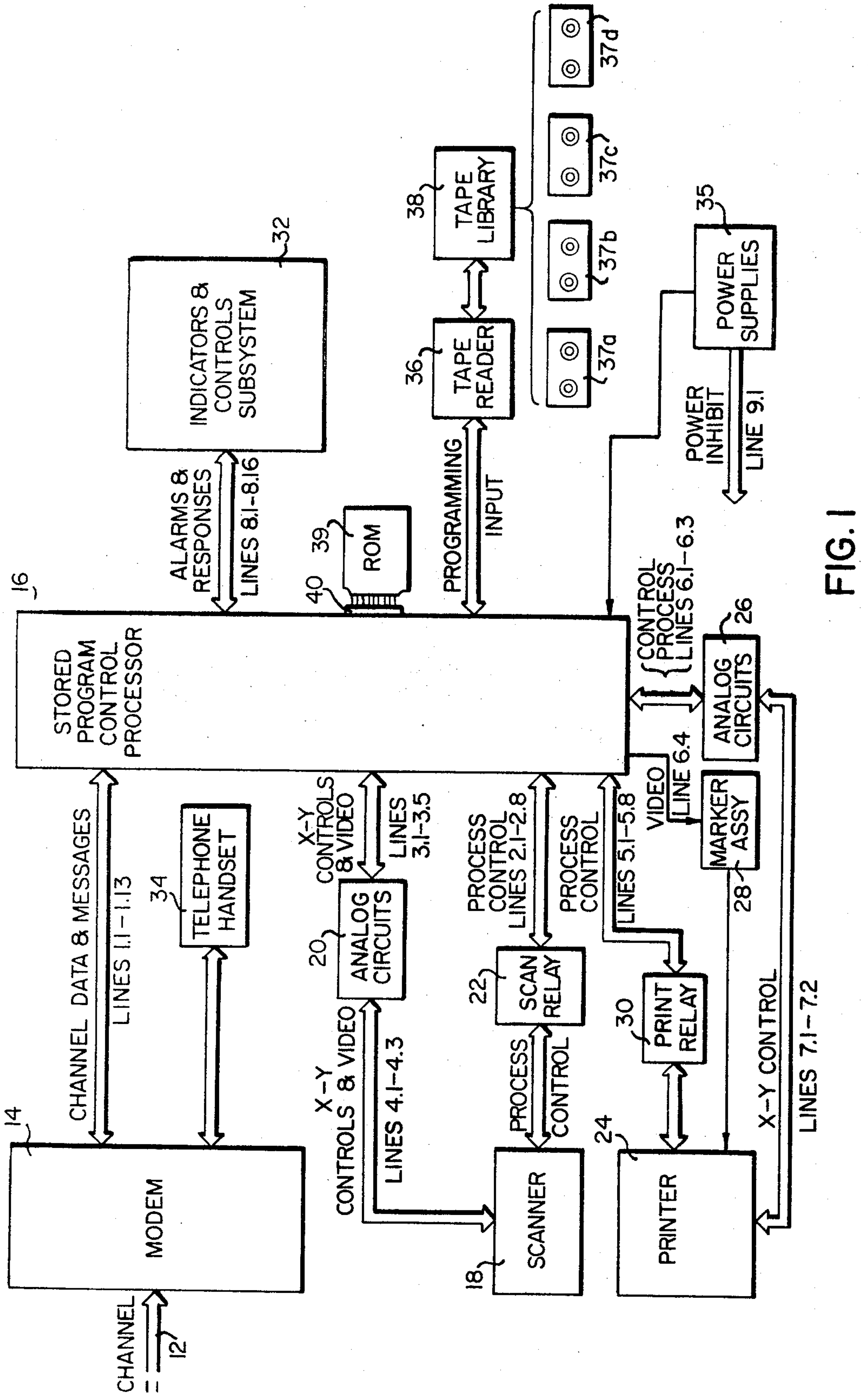
FIG. 1 is a system block diagram for a stored program facsimile system which may be selectively programmed to operate according to one of a plurality of selectable program instructions.

Referring to FIG. 1 a block diagram is shown indicating basic operation of a facsimile transceiver incorporating a stored program facsimile controller according to the invention. A data channel 12 is established between one transceiving station such as shown in FIG. 1 and a remote transceiving station not shown. The channel 12 will normally comprise a set of the normal dial system transmission lines used in the telephone network. Signals carried by the channel 12 are sent and received by a modem 14 which may be the American Telephone and Telegraph Company Model 203A Type Data Set. The modem 14 communicates with a stored program control processor 16 over a plurality of hard wired lines numbered 1.1 through 1.13 between the modem 14 and control processor 16 for the exchange of data and control signals.

A scanner 18 is provided which communicates with the control processor 16 through analog circuits 20 using lines number 4.1–4.3 and 3.1–3.5 respectively in order to provide scanning control of the scanner 18 and to receive analog video signals for processing into discrete binary signals before application to the control processor 16. A scan relay circuit 22 is further provided as buffer between the scanner 18 and control processor 16 for additional control and conditioning signals between the scanner 18 and control processor 16 over lines 2.1–2.8 these signals detect and feed documents being scanned and control scanner illumination.

A printer 24 is associated with the control processor 16 and has scan line control signals provided to it from analog circuits 26 over lines 7.1 and 7.2 which in turn receive line printing and line stepping signals from the control processor 16. A marker assembly 28, such as a laser subsystem, receives video signals on a line 6.4 from the control processor 16 in digital form to cause respective marking or nonmarking of portions of each line as paper is processed through the printer 24. A print relay circuit 30 is provided between the printer 24 and control processor 16 to buffer printer control signals and printer status indications on lines 5.1–5.8 that govern and indicate the status of paper and other elements in the printer 24.

An indicators and controls subsystem 32 is provided in communication with the control processor 16 over a plurality of alarm and response lines 8.1–8.16 which send to the subsystem 32 malfunction and mode signals for indication thereby, and which transmit operator signals from the indicators and controls subsystem 32 to the control processor 16 for processing and communication over the channel 12.

A telephone handset 34 is located in the system to provide voice communication through the modem 14 so that, upon predetermined conditions within the control processor 16, operator voice communications can be conducted over the data channel 12.

The control processor 16 is further hardwired into a tape reader 36 which has available a number of individual tapes 37*a*–37*d* preferably on tape casettes, from a tape library 38. Each of the tapes 37*a*–37*d* in the tape library 38 is magnetized with one or more predetermined facsimile control programs such as different coding schemes, scan and print sequencing and diagnostic programs which when read by the tape reader 36 are stored in the control processor 16 to establish a predetermined operation for the facsimile transceiver. The control processor 16 is typically a small computer, or mini-computer, of the type represented by Varisystems (P-16), but may be any computer of suitable capacity.

Alternatively, or additionally, a selected program may be stored in processor 16 as a read-only memory card 39 inserted into a socket 40 of the processor 16. An advantage to be gained by use of a read-only memory is its relative indestructibility in the event of a power failure.

A power supply system 35 is provided with appropriate power lines to the units of FIG. 1 as necessary, and a warmup time delay indication line 9.1. While the control processor 16 is hardwired to all units in FIG. 1 in accordance with predetermined signals required and provided by the modem, scanner, printer and other units, actual operation of the system is dependent upon a specific program being entered through the tape reader 36 from the tape library 38 or from the read-only memory 39. Before placing a call, the operator can, on the basis of the observed characteristics of a document to be transmitted by facsimile, select a tape from the library 38 which is known to have a particularly efficient coding scheme for that type of document. The operator may also select a preprogrammed tape from the library 38 in accordance with specific characteristics of the remote facsimile station to which data is being sent or from which data is being received. The control processor 16 is then programmed to provide operation of the facsimile system of FIG. 1 which is compatible with the operation of the remote system and the document being transmitted. Exemplary of such operation would be the ease in adapting the facsimile system of FIG. 1 for operation with both synchronous and asychronous remote stations.

The advantages of stored program control functioning are particularly significant in a facsimile application where the development of national and international facsimile stations is not subject to standardization by single company management or a stable and mature technology. Each transceiver is the product of sophisticated, independent technological development and is thus generally incompatible with other independently developed facsimile systems. With the system of FIG. 1 however, it is possible to achieve compatibility with other facsimile systems, to obtain the latest facsimile technological developments, and to operate with different or improved associated units, by the provision of different stored programs. As system sophistication is increased and new facsimile concepts brought into practical operation, these too can be readily embodied in the system of FIG. 1 through the expedient of reprogramming the processor 16 in response to a newly written program stored on one of the tapes in the library 38 or read-only memory card 39. It is also possible to adapt with relative ease to different modems, scanners, printers or other units with a minimum of hardwiring change.

As a further advantage, a basic facsimile station, as indicated in FIG. 1, can be quickly and efficiently assembled and inexpensively provided to satisfy varying needs for facsimile communication. Higher user sophistication or individualized operation can then be provided in accordance with user need and available technology through the provision of additional, preprogrammed tapes or cards.

With the above general functioning of the stored program facsimile control system in mind, detailed and specific functioning of the system in response to several selectable programs will be indicated below.

To understand the specific functioning, a particular set of exemplary hard wiring signal and data lines between the control processor 16 in FIG. 1 and the peripheral facsimile station equipment are indicated below in tabular form. For the channel data and message lines between the modem 14 and control processor 16, the following hard wired lines exist:

FOR SIGNALS FROM THE CONTROL PROCESSOR TO THE MODEM 1.1 SEND DATA
1.2 REQUEST TO SEND
1.3 SECONDARY DATA TRANSMIT
1.4 DATA TERMINAL READY

FOR SIGNALS FROM THE MODEM TO THE CONTROL PROCESSOR 1.5 DATA SET READY
1.6 SERIAL CLOCK TRANSMIT
1.7 SECONDARY CARRIER ON
1.8 SECONDARY DATA RECEIVE
1.9 CLEAR TO SEND
1.10 SERIAL CLOCK RECEIVE
1.11 DATA CARRIER DETECTED DELAYED
1.12 RECEIVE DATA
1.13 SECONDARY RING TO SEND
1.14 RING INDICATOR

In the normal telephone line connection between facsimile stations, provided by the modem indicated above, two communication channels are available to carry independent electrical signals. As they relate to signal processing of the facsimile station in the present invention, these two independent signal lines are referred to as the high speed forward, normally undesignated, channel and the slower reverse or secondary channel.

The significance of the various hard wired signal lines to and from the modem 14 are explained as follows.

1.1 the SEND DATA line conducts data from the control processor 16 to the modem 14 for transmission over the forward channel. The control processor provides this data in response to an internal software command.

1.2 The REQUEST TO SEND line is signalled by the control processor at various points in software execution. It initially functions to establish operation of the forward channel in the transmit mode. The presence or absence of a signal on the REQUEST TO SEND line has significance which will be described below.

1.3 The SECONDARY DATA TRANSMIT is similar to the SEND DATA line, but applies to data transmission over the reverse or secondary channel by a transceiver operating as a receiver. Data is sent over it in response to predetermined software commands within the control processor 16.

1.4 The DATA TERMINAL READY line is in an ON condition when the control processor software routines recognize an operational condition for itself and the associated peripheral equipment.

1.5 The DATA SET READY line is activated by the modem to indicate to the control processor that the modem is operational.

1.6 The SERIAL CLOCK TRANSMIT line provides clocking signals for the serial transfer of data over the SEND DATA line (1.1).

1.7 The SECONDARY CARRIER ON line carries a signal to the control processor when operating as a transmitter to indicate that information is present within the modem and is to be received by the control processor over the SECONDARY DATA RECEIVE line (1.8).

1.8 The SECONDARY DATA RECEIVE line conducts data from the modem to the control processor in response to a software command within the control processor.

1.9 The CLEAR TO SEND line is used by the modem to indicate to the transmitting control processor that the modem will accept data on the SEND DATA line (1.1).

1.10 The SERIAL CLOCK RECEIVE line provides clocking for the serial transfer of data over the RECEIVE DATA line (1.12).

1.11 The DATA CARRIER DETECTED DELAYED line allows the modem to signal the receive control processor that the forward channel is in use.

1.12 The RECEIVE DATA line is used for conveying forward channel data from the modem to the receive control processor 16 in response to an internal software command during an interrupt.

1.13 The SECONDARY CLEAR TO SEND line indicates to the control processor that the reverse channel is available for sending data.

1.14 The RING INDICATOR line is used to reset the system from certain alarm conditions when a new call comes in.

From the scanner, through the scan relay 22 to the control processor 16 a number of process control lines are hard wired, depending upon the specific nature of the scanner employed. The scan relay 22 provides logic buffering between the scanner and the control processor 16.

FROM THE CONTROL PROCESSOR TO THE SCAN RELAY 2.1 SCANNER COPY FEED
2.2 LAMP OPERATE

FROM THE SCAN RELAY TO THE CONTROL PROCESSOR 2.3 FEEDER AUTO/MAN
2.4 BACK TO BACK
2.5 FORCE FEED
2.6 PAPER START
2.7 SLEW STOP
2.8 SCANNER COPY EXIT

Between the control processor 16 and scanner 18, orthogonal X and Y direction control and digital video signals are exchanged through the analog circuits 20. Between the analog circuits 20 and control processor 16 the following hard wired lines exist.

FROM PROCESSOR TO ANALOG CIRCUITS 3.1 SCAN X SWEEP
3.2 SCAN Y STEP
3.3 VIDEO PROCESSOR INHIBIT

FROM ANALOG CIRCUITS TO PROCESSOR 3.4 SCAN DIGITAL VIDEO
3.5 SUPER WHITE

Between the analog circuit 20 and the scanner 18 the wiring includes one or more lines designated:

FROM ANALOG CIRCUITS TO SCANNER 4.1 MOTOR STEP
4.2 SCAN GALVO SWEEP

FROM SCANNER TO ANALOG CIRCUITS 4.3 ANALOG VIDEO

Figure 1B:
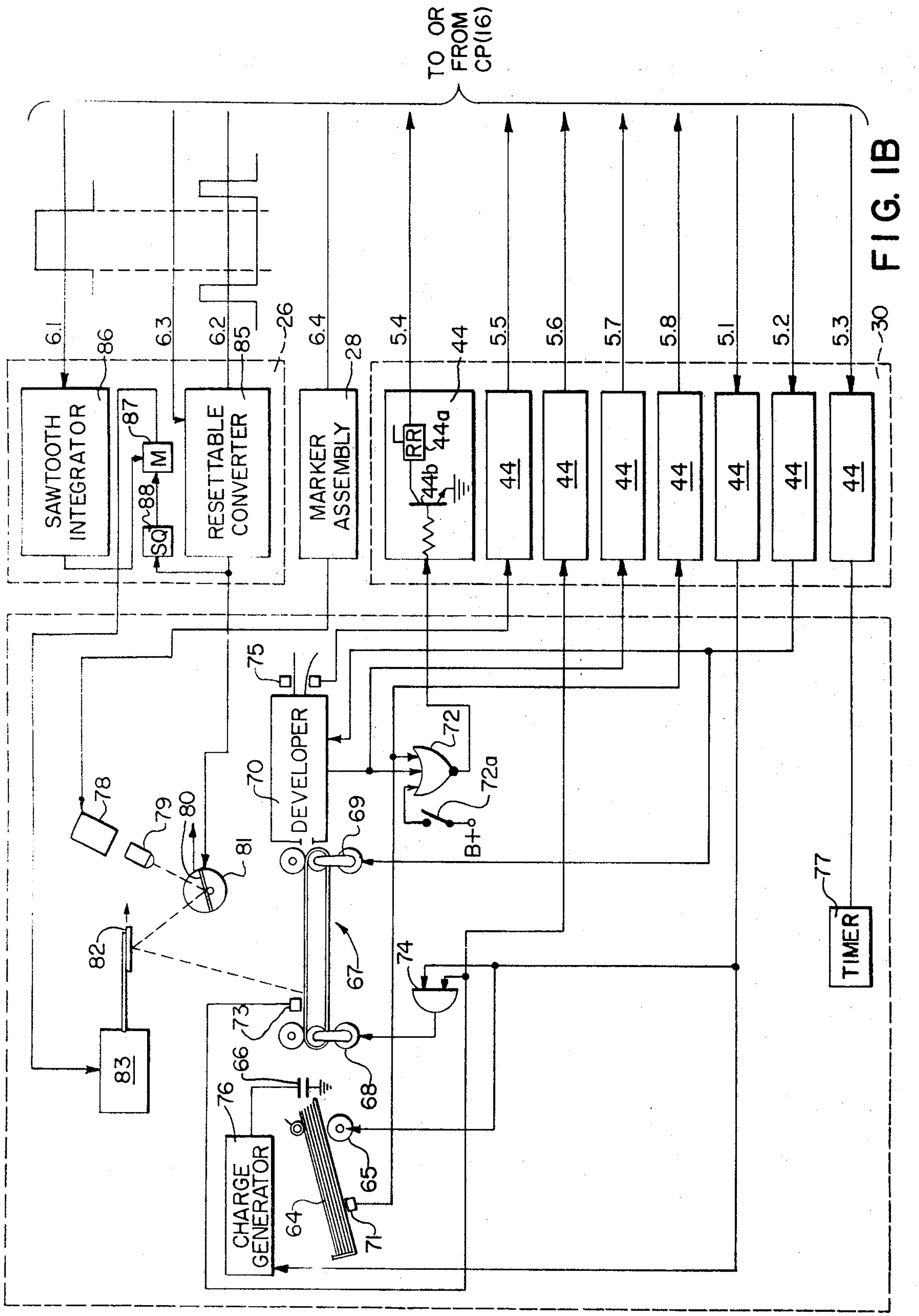
Figures 1C, 1D:
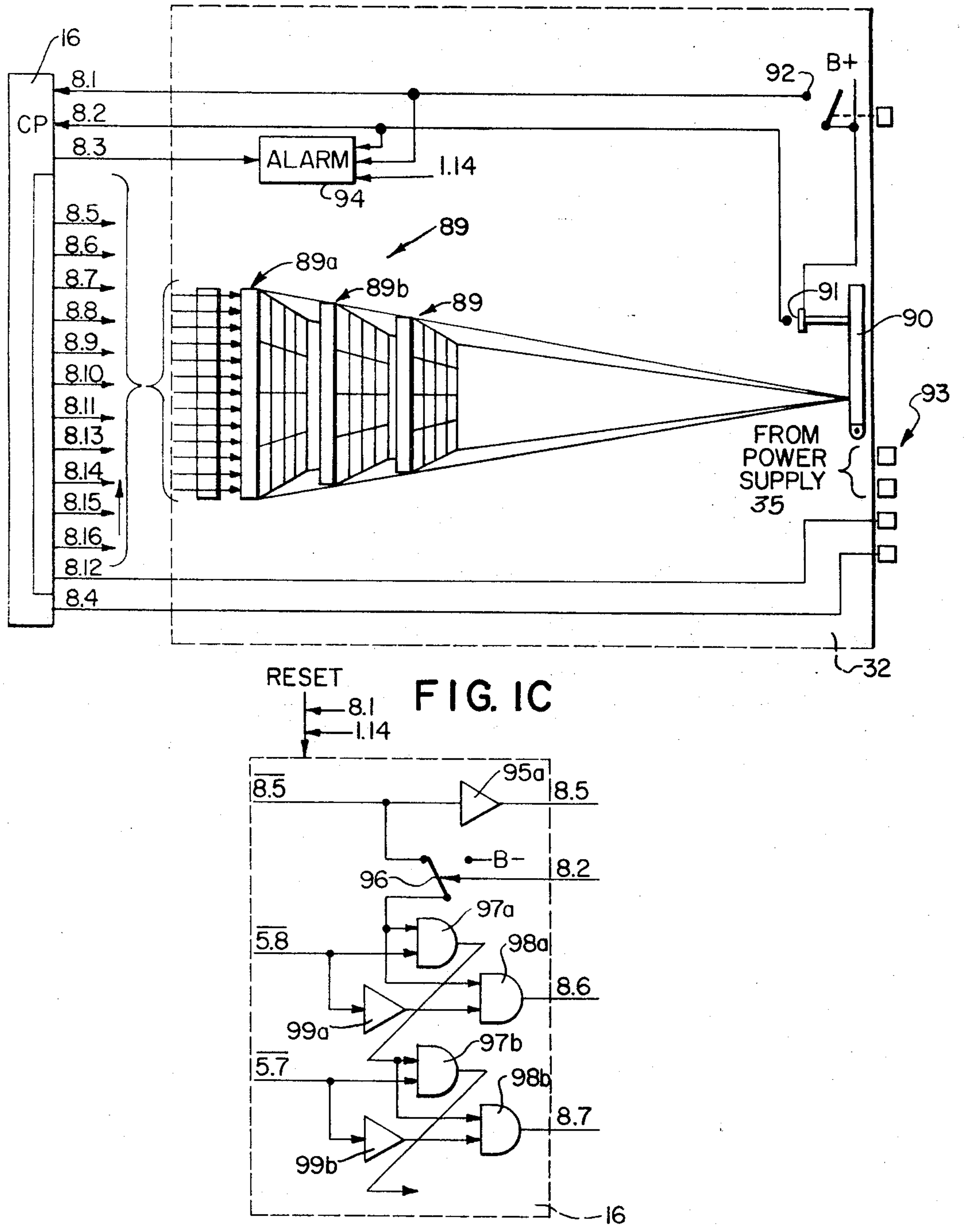

To further the understanding of the stored program control of the facsimile system, FIGS. 1A–1C show diagrammatic mechanism and circuit details indicating how signals are applied and derived from the scanner 18, printer 24 and indicators and controls subsystem 32 and the associated hardware which is indicated in FIG. 1. With particular reference to FIG. 1A, the scanner 18 is indicated as having a document path 41 over which a document 42 is initially fed by a paper feed motor 43 receiving excitation from the scan relay 22 through an isolation relay circuit 44 to prevent erroneous application of potential at points within the scanner 18 from being passed through to the control processor 16 over, in this case, the SCANNER COPY FEED line (2.1). Isolation circuit 44 includes a reed relay 44*a* providing relaying of digital signals to the motor 43 by contact closure. Relay 44*a* is driven into operation by a transistor amplifier 44*b*.

Further along the document path 41 a stepping motor drive system 45 receives the document between rollers and passes it along a path under a light pipe 46 and associated photoelectric detector 47. The light pipe 46 extends across the width of the document and is oriented to receive light reflected from the document from a moving spot scanning system composed of a mirror 48 and mirror galvanometer 49 which reflects light onto the document 42 adjacent to the reception position of the light pipes 46. Light is initially generated from a bulb 50 and imaged by a lens 51 through an aperture 52 to a further lens 53 and reflecting surface 54 which directs the illumination to the scanning mirror 48 and subsequently to a spot produced by the aperture 52 onto the document 42 where reflections can be collected by the light pipe 46. Photoelectric position detectors 55, 56, and 57 are placed along the document path 41 respectively ahead and after motor 43 and at the end of path 41 to provide the PAPER START, SLEW STOP, and SCANNER COPY EXIT line signals (2.6, 2.7, and 2.8) through respective isolation circuits 44 in the scan relay 22.

Additionally, switches 58, 59, and 60, located in the scanner 18 for operator actuation, provide signals through respective isolation circuits 44 to the corresponding FEEDER AUTO/MAN, BACK TO BACK, and FORCE FEED lines (2.3, 2.4, and 2.5).

Within the scan analog circuit 20 a video processor 61 receives the signal from the photodetector 47 and provides a digital output on the SCAN DIGITAL VIDEO line (3.4) to the control processor 16 along with a detected indication of strong specular reflection on the SUPER WHITE line (3.5). In order to produce this signal in the detector 47 a portion of the document path 41 below the scanning spot from the mirror 48 is silvered to provide a strong specular reflection of light into the light pipe 46 when the scan spot hits a hole or paper border. The VIDEO PROCESSOR INHIBIT line (3.3) signal is applied to the video processor 61 to inhibit the output on the lines (3.4 and 3.5) except during scanning of a line.

Also within the scan analog circuits 20 a sawtooth integrator 62 receives a square wave signal on the SCAN X SWEEP line (3.1) and converts it into a sawtooth signal, in a manner known in the art, for application to the mirror galvanometer 49. To provide digital incrementing of the stepping motor 45 a phase generator and current switch 63 is also provided within the scan analog circuits 20 and receives a series of pulses from the control processor 16 over the SCAN Y STEP line (3.2). These pulses are converted, in ways known in the art, to appropriate signals for driving the stepping motor 45 one step at a time.

The significance of each hard wired line (normally a twisted pair) between the processor 16 and scan relay 22 is indicated below.

2.1 The SCANNER COPY FEED signal from the control processor causes the scan document to be fed along the document path within the scanner 18 up to a "slew stop" point, which is a predetermined number of lines before the document leading edge is at the point of scan.

2.2 The LAMP OPERATE line is used for turning on the scanner light 50 and is normally operated in tandem with the REQUEST TO SEND line (1.2).

2.3 The FEEDER AUTO/MAN line is used by the operator in conjunction with control 58 on the scanner 18 to inhibit the control processor from feeding a document through the scanner.

2.4 The BACK TO BACK line is used to signal the control processor in response to activation of control 59 on the scanner that the operator wishes to test facsimile system operation and causes predetermined subroutines within the control processor 16 to be activated whereby a facsimile reproduction of the document being scanned is produced, locally, at printer 24.

2.5 The FORCE FEED line conveys a signal from control 60 on the scanner that commands the control processor to cause incremental advancing of the document through the scanner by pulses on the SCAN Y STEP line (3.2).

2.6 The PAPER START line in conjunction with position detector 55 signals the control processor that a document has been inserted in the scanner and is waiting for transmission.

2.7 The SLEW STOP line in conjunction with detector 56 signals the control processor that a document leading edge has advanced to a point a predetermined number of scan lines before the point of initial scanning.

2.8 The SCANNER COPY EXIT line in conjunction with detector 57 provides a signal to the control processor that a document has passed completely through and out of the scanner.

The explanation of the hard wired lines (normally coaxial) cable) between the control processor 16 and analog circuit 20 is indicated as follows:

3.1 The SCAN X SWEEP line is used in response to a software command within the processor 16 to apply a square wave signal to integrator 62 within the circuits 20, and in turn provide a sawtooth wave to galvanometer 49 in the scanner 18 over the SCAN GALVO SWEEP line or lines (4.2), to cause the oscillating scanning mirror 48 to scan a single line on the document. At the same time the control processor receives and encodes, as explained below, the digital video signal from processor 61 on the SCAN DIGITAL VIDEO line (3.4) as a digital representation of the ANALOG VIDEO line signal (4.3).

3.2 The SCAN Y STEP signal is generated by the processor in conjunction with the SCAN X SWEEP (3.1) signal and causes the document to advance one scan line space through the scanner in response to a MOTOR STEP signal on line or lines (4.1) after completion of scanning of a line.

3.3 The VIDEO PROCESSOR INHIBIT defines, under processor control, the expected edges of the scanned document in time. It is deactivated a short interval after generation of SCAN X SWEEP when the scanning spot on the page, having started off the page to acquire momentum, is expected to be at the first page edge. It is reactivated after an interval sufficient for the spot to reach the opposite edge of the page. This signal inhibits any digital signals from the video processor 61 within the analog circuits 20, and thus defines the vertical borders of the document being scanned.

3.5 The SUPER WHITE line is activated upon detection of a specular reflection characteristic in the ANALOG VIDEO signal on coaxial line (4.3) such as from a mirror over which the document passes through the scanner and, if detected for a predetermined length of time, as defined within the processor 16 by software operations, is an indication of the end of the document being scanned.

The other X-Y control and video signal lines indicated above have been defined in conjunction with other signal lines.

Between the control processor 16 and the printer 24 a series of process control signals pass through the print relay 30, a video signal is communicated through the marker assembly 28, and X-Y control signals are communicated through analog circuits 26.

The hard wiring between the print relay 30 and the control processor 16 includes:

FROM PROCESSOR TO PRINT RELAY 5.1 PRINT FEED
5.2 PRINT FLUSH
5.3 PULSE COUNTER

FROM PRINT RELAY TO CONTROL PROCESSOR 5.4 PRINTER READY
5.5 PRINT COPY EXIT
5.6 READY TO PRINT
5.7 DEVELOPER LOW
5.8 PAPER OUT

The lines from the processor to the analog circuits 26 and marker assembly 28 include:

FROM PROCESSOR TO ANALOG CIRCUITS AND MARKER ASSEMBLY 6.1 PRINT X SWEEP
6.2 PRINT Y INCREMENT
6.3 PRINT Y RESET
6.4 PRINTER VIDEO (To Assembly 28)

The printer 24 and associated print analog circuit 26, marker assembly 28, and print relay 30 are indicated in FIG. 1B. The printer mechanism comprises a paper stack 64 from which sheets of zinc oxide paper are fed through a single cycle drive mechanism 65 which, upon actuation, is driven for an interval sufficient to drive one sheet out of the stack 64 and then terminate drive before a second sheet is started. Sheets driven from the stack 64 by the drive mechanism 65 pass through electro-static charging plates 66 onto a belt and roller system 67 which is driven by a motor 68. Paper is driven off the belt drive system by a motor 69 into a paper developer 70 from whence it exits.

A detector switch 71 located below the paper stack 64 detects when a paper out condition exists and supplies a signal through the print relay 30, via an appropriate isolation circuit 44, to the PAPER OUT line (5.8). The signal from the detector 71 also feeds an inverting OR gate 72 whose output is supplied through the print relay 30, via appropriate isolation circuit 44 to the PRINTER READY line (5.4). A switch 72*a* provides a further input to gate 72 when a paper door is open. A paper position detector 73 is located at a point along the belt system 67 to indicate the presence and proper positioning of paper for exposure. The signal from the detector 73 is supplied to the gating circuit 74 and through appropriate isolation circuit 44 in the relay 30 to the READY TO PRINT line (5.6). Finally, a photoelectric detector 75 located at the paper exit of the developer 70 detects exiting of paper which, through an appropriate isolation circuit 44, provides the PRINT COPY EXIT signal on line (5.5). The developer 70 provides a signal to the OR gate 72 and also, through the relay 30 and an isolation circuit 44, to the DEVELOPER LOW line (5.7).

The PRINT FEED line (5.1) signal is supplied to an appropriate isolation circuit 44 within the print relay 30 and thence in parallel to a charge generator 76 and AND gate 74 for respectively charging the electrostatic plates 66 and driving the motors 65 and 68. The PRINT FLUSH line (5.2) signal is similarly applied through an isolation circuit 44 to the developer 70 and drive motor 69 to drive an exposed page from the belt system 67 into the developer 70 where it is toned, dried and fed out of the developer past the detector 75. The PULSE COUNTER line (5.3) signal also is relayed through an appropriate isolation circuit 44 to a timer mechanism 77 to provide running time as indicated below.

Exposure of paper properly positioned along the belt 67 is accomplished by light from a laser 78 operating in response to light modulation signals from the marker assembly 28. Light from the laser 78 is reduced in spot size through a lens system 79 and applied to a Y direction scanning mirror 80 operated by a Y galvanometer 81. Laser illumination from the mirror 80 is reflected to an X scanning mirror 82 controlled by an X galvanometer 83 from whence it is reflected to the photosensitive, charged surface of paper on the belt system 67.

Within the print analog circuit 26 the PRINT Y INCREMENT signal, as a series of pulses on line (6.2), is fed to a resettable converter 85 such as an integrator to produce a level output increasing with each pulse on that line (6.2), each pulse representing a one line increment of print data. The PRINT Y RESET line (6.3) signal is applied as a reset signal to the converter 85 and causes the analog output to return to an initial value which when applied to the Y galvanometer 81 returns the laser spot to a point above the top of the page position as indicated below. A square wave signal on the PRINT X SWEEP line (6.1) is applied to a sawtooth integrator 86 of conventional design like the integrator 62 in FIG. 1A. The output of the sawtooth integrator 86, however, is applied to a multiplier 87 as a multiplicand input. A multiplier input is obtained from a squaring circuit 88 which squares the output of the resettable converter 85. The output of the multiplier 87 is applied to the X galvanometer 83 and is compensated through the multiplier 87, and squarer 88 to reduce the angle of X rotation as the Y signal, normally zero at center page, increases in positive and negative magnitude. This compensation reduces the pincushioning effect that otherwise would occur as the Y signal magnitude increased.

The significance of the various signal lines (coaxial cable) between the processor 16 and printer 24 are indicated as follows.

6.1 The PRINT X SWEEP line is activated with a square wave by a software command that causes integrator 86 in the analog circuits 26 to produce a compensated sawtooth output to the PRINT X GALVO SWEEP line (7.2) and cause oscillating scan mirror 82 within the printer to sweep one line across the photosensitive page.

6.2 The PRINT Y INCREMENT line signal causes the Y direction scan mirror 80 to advance one scan line by augmenting the output of converter 85 of the analog circuits 26, the PRINT Y GALVO line (7.1), one line space. It is activated with a pulse when the PRINT X SWEEP signal has scanned a line.

6.3 PRINT Y RESET line provides a reset signal for Y initial positioning from processor 16.

6.4 The PRINTER VIDEO line provides a modulation signal through the assembly 28 to laser 78. It is fed digital scan line signals coincident with activation of the PRINT X SWEEP line.

Between the control processor 16 and print relay 30, hard wired lines have the following significance.

5.1 The PRINT FEED line causes a page of photoconductive material to be charged and placed in position for exposure on belt system 67 by activating drives 65 and 68 and charge generator 76.

5.2 The PRINT FLUSH line is activated by a software command and causes an exposed page to be processed and the latent image developed. Such developing can, for instance, include liquid toning and subsequent drying.

5.3 The PULSE COUNTER line is activated by a soft-ware actuation of either the REQUEST TO SEND or DATA CARRIER DETECTED DELAYED lines (1.2 and 1.11) to cause timer 77 to total the time during these states.

5.4 The PRINTER READY line is activated when neither the DEVELOPER LOW or PAPER OUT lines (5.7 or 5.8) are activated and switch **72*a*** is open.

5.5 The PRINT COPY EXIT line signals the control processor that a page has not exited from the printer in proper fashion and thereby indicates a paper jam condition detected by the printer 26. A paper jam is detected by failure of paper sensing detector 75 to indicate passage of paper a predetermined interval after the PRINT FLUSH (5.2) signal is activated.

5.6 The READY TO PRINT line signals the processor that paper is detected by switch 73 to be in place in the exposure position of the printer.

5.7, 5.8 The DEVELOPER LOW and PAPER OUT lines (5.7 and 5.8) indicate respectively the lack of sufficient image developer or toner and lack of printing paper in the printer 24 from switch 71.

Between the control processor 16 and the indicators and controls subsystem 32 the hard wired lines are designated as indicated below.

FROM THE INDICATORS AND CONTROLS SUBSYSTEM TO THE PROCESSOR

8.1 REMOTE OPERATOR SWITCH
8.2 KEY OPERATOR SWITCH

FROM THE PROCESSOR TO THE INDICATORS AND CONTROLS SUBSYSTEM

8.3 AUDIBLE ALARM
8.4 REMOTE OPERATOR
8.5 CALL KEY OPERATOR
8.6 PAPER OUT
8.7 DEVELOPER LOW
8.8 PAPER DOOR OPEN
8.9 JAM
8.10 CHANNEL OUT
8.11 EXCESSIVE ERROR RATE
8.12 LOCAL UNIT NOT READY
8.13 REMOTE UNIT NOT READY
8.14 BACK TO BACK
8.15 TRANSMITTING
8.16 RECEIVING

The significance of these lines is as follows:

8.1 The REMOTE OPERATOR SWITCH is activated by a control on the indicators and controls subsystem 32 by the operator when it is desired to communicate by voice with the remote station through the telephone handset 34. The line is sampled by routines within the control processor 16 and when detected as activated the processor causes a predetermined code to be transmitted to indicate a desire for voice communication.

8.2 The KEY OPERATOR SWITCH line is activated by the operator in response to a general alarm condition, its activation causing an indication of the specific alarm condition. If more than one condition exists it causes indication of the most significant existing alarm condition according to a predetermined priority system which may be either hard wired within the control and indicator subsystem 32 or the result of software routines within the control processor 16.

8.3 The AUDIBLE ALARM line is activated by software commands within the processor when an alarm condition exists.

8.4 The REMOTE OPERATOR line is activated by a software command and deactivated by the REMOTE OPERATOR SWITCH (8.1). It results in a visual indication within the system 32 that the operator at the remote unit desires to establish voice communication and is the local result of remote activation of the REMOTE OPERATOR SWITCH line (8.1).

8.5 The CALL KEY OPERATOR line is activated when any alarm condition exists. It is deactivated, along with its corresponding indicator, in response to activation of the KEY OPERATOR SWITCH line (8.2) or activation of the RING INDICATOR line (1.14) to reset the system from a CHANNEL OUT or EXCESSIVE ERROR RATE condition when an operator is not in attendance. Thereafter one of the alarm condition lines is activated in an order of priority to indicate the specific condition causing the alarm.

The PAPER OUT and DEVELOPER LOW lines (8.6 and 8.7) are enabled in response to corresponding conditions on the PAPER OUT and DEVELOPER LOW lines (5.8 and 5.7).

8.8 The PAPER DOOR OPEN line is activated when the PRINTER READY is determined to be not activated in response to a software testing thereof, and the PAPER OUT and DEVELOPER LOW lines (8.6 and 8.7) are unactivated.

8.9 The JAM line is used when either the SCANNER COPY EXIT or the PRINT COPY EXIT lines (2.8 or 5.5) are activated and sampled by software operation.

8.10 The CHANNEL OUT line is activated by a software command in response to the absence of a signal on the DATA SET READY line (1.5).

8.11 The EXCESSIVE ERROR RATE line is activated by a software command and deactivated by absence of a signal on the DATA SET READY line (1.5).

8.12 The LOCAL UNIT NOT READY line is activated whenever the POWER TIME DELAY INTERLOCK line (9.1) in the power supply 35 is activated indicating that the predetermined warm up dalay periods have not elapsed from turn on of the equipment.

8.13 The REMOTE UNIT NOT READY line is activated by software and in the absence of a predetermined recognizable signal on the reverse channel at the transmitter.

8.14 The BACK TO BACK line is activated whenever the BACK TO BACK line (2.4) is signaled.

8.15 The TRANSMITTING line is enabled whenever the CLEAR TO SEND line (1.9) is active.

8.16 The RECEIVING line is activated whenever the DATA CARRIER DETECTED DELAYED line (1.11) is activated.

FROM THE POWER SUPPLIES TO THE PROCESSOR

As indicated above, the power supply 35 provides a hard wired signal line to the control processor 16 identified as POWER TIME DELAY INTERLOCK line (9.1).

Turning to FIG. 1C, details of the indicators and controls subsystem 32 are presented. A multiple frame projection system 89 is shown composed of a lamp matrix 89 which receives respectively most of the signals on lines 8.5–8.16 from the control processor 16. Each signal illuminates a corresponding lamp in the matrix 89*a*. The lamp matrix 89*a* cooperates with an image matrix 89*b* and a lens matrix 89*c* such that illumination of a given lamp within the matrix 89*a* causes only one image in the matrix 89*b* to be imaged by a corresponding lens in the lens matrix 89*c* onto a projection screen 90 which is located on a front panel of the indicators and controls subsystem 32. The projection screen 90 is mechanically connected with a switch 91 such that pushing on the screen 90 activates the switch 91 and produces the KEY OPERATOR SWITCH line (8.2) signal fed to the control processor 16. A further front panel switch 92 is operator activated to produce the REMOTE OPERATOR SWITCH line (8.1) signal. Additional lights 93 on the front panel are continuously illuminated without going through the projection system in response to the LOCAL UNIT NOT READY line (8.12) signal from the power suppy 35 or the REMOTE OPERATOR line (8.4) signal. An alarm 94 such as a buzzer is provided within the subsystem 32 to produce an audible signal in response to an electrical signal on the AUDIBLE ALARM line (8.3).

FIG. 1D provides a hardwired version of a priority system whereby each lamp in the matrix 89 of FIG. 1C is illuminated in an order of priority which insures that predetermined conditions are indicated in precedence over other conditions lower in the priority chain. The CALL KEY OPERATOR signal has the highest priority and its inverse generated within the processor 16 is supplied through an inverter 95*a* to produce the CALL KEY OPERATOR line (8.5) signal. The input to the inverter 95*a* is supplied to a switch 96. Switch 96 is activated by the KEY OPERATOR SWITCH line (8.2) signal. In the deactivated state it feeds the input to the inverter 95*a* into one input of an AND gate 97*a*. When activated the switch 96 toggles to provide a signal to the input of the AND gate 97*a* that disables the key operator signal as top priority. A second input to the AND gate 97*a* is the inverted PAPER OUT line (5.8) signal from print relay 30. This inverted signal is applied through an inverted 99*a* to an input of an AND gate 98*a*. A further input of the AND gate 98*a* receives the signal from the switch 96. The output of the AND gate 98*a* provides the PAPER OUT line (8.6) signal. The output from the AND gate 97*a* is applied as an input to an AND gate 97*b*. The AND gate 97*b* also receives the inverted DEVELOPER LOW line (5.7) signal from print relay 30. The two inputs to the AND gate 97*b* are also applied as inputs to an AND gate 98*b*, the input from the inverted DEVELOPER LOW line (5.7) being inverted by an inverter 99*b*. The output of the AND gate 98*a* provides the DEVELOPER LOW line (8.7) signal fed to subsystem 32. The system continues on through repeating stages of AND gates and inverters having designations 97, 98 and 99 respectively. The output of all AND gates with the designation 97 provide the priority chain signals, these outputs being at an inhibit level for subsequent AND gates with the designations 97 if any of the higher priority signals exist. The signal outputs from the 97 type AND gates are also applied as one input to the AND gates with the designation 98 along with an inverted signal from the previously inverted condition signal being sampled. Thus, if no higher priority alarm is activated, one input to a given type 98 AND gate will be enabled. Then if the condition at that priority level is activated, it too will provide an enable input to that type 98 AND gate resulting in an output signal on the appropriate line for indicating the activated condition. The alarm 94 and FIG. 1D system is reset by lines 8.1 and 1.14, alarm 94 by line 8.2.

Referring now to FIGS. 2A–2I, a series of steps are indicated in algorithm to illustrate an examplary instruction set for stored program operation of the control processor 16 of FIG. 1. The operation indicated by these algorithms is accomplished within the control processor 16 in response to programming instructions received from the tape reader 36, or an inserted readonly memory card 39. Each step or decision indicated in these flow charts may in actual implementation by the control processor 16 involve more than one step or decision, each step occasionally being an entire subroutine by itself. The programming of these additional substeps is, however, within the skill of the average programmer, and to eliminate added complexity they will not be repeated here. Also, in order to perform each step or decision, particularly where a mechanical sequence is necessitated, an amount of time must elapse before other steps are activated. Accordingly, and when necessary, such delays must be built into the step-by-step operation indicated by the algorithm, these also being within the skill of the art of programming.

Figure 2A:
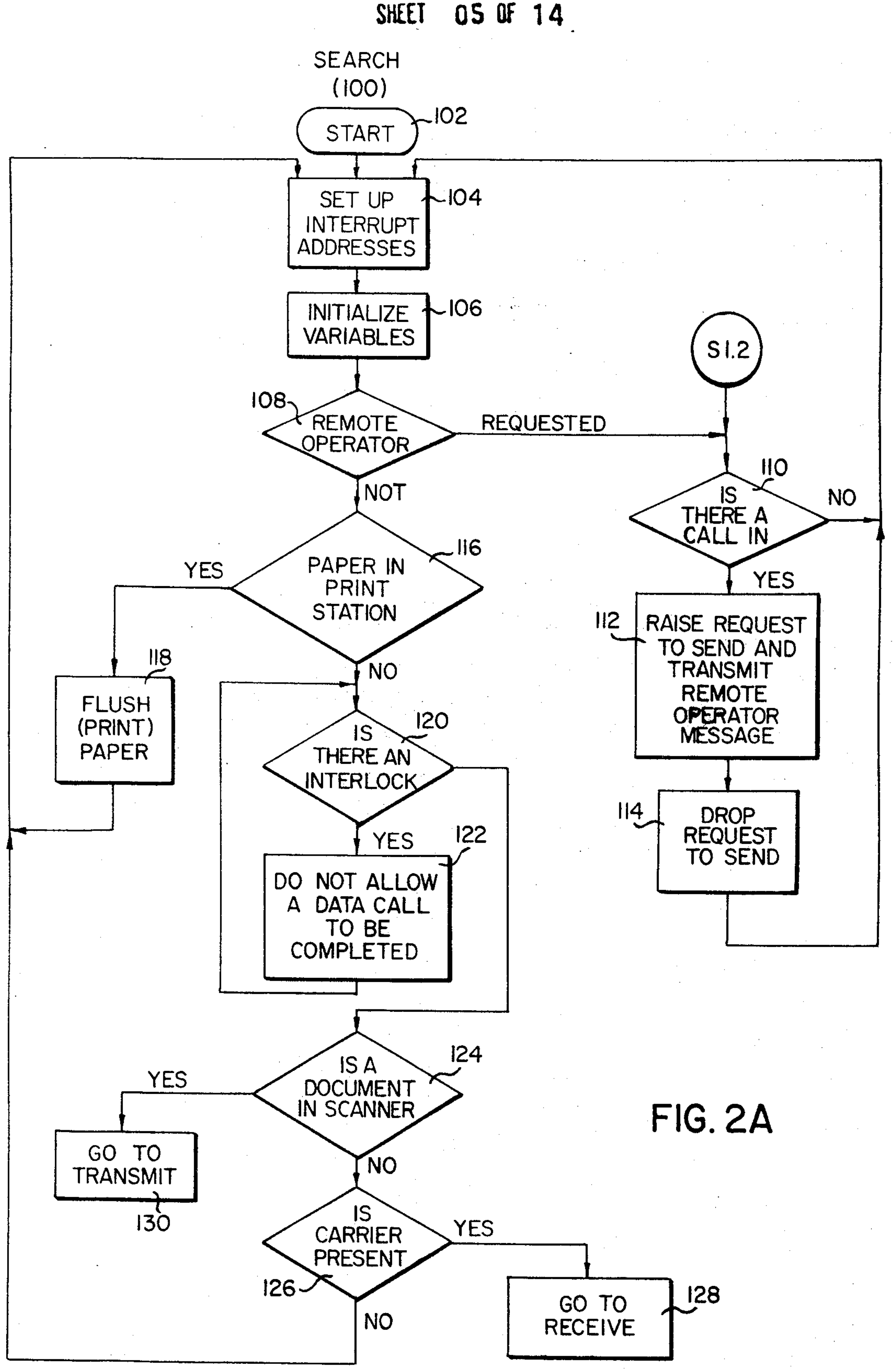

Referring to FIG. 2A, an initial set of steps is programmed to determine whether a particular facsimile station is to go into a receive or transmit mode. From a search status 100 (during or prior to which a new program may be entered), the control processor 16 is triggered into a start condition 102 by activation of a facsimile station for operation. From the start step 102 the processor goes directly into an operation 104 in which transmitter operations interrupt adresses are established within the control processor. Whenever an interrupt condition is sensed by the control processor, it goes to an appropriate subroutine, as determined by the address corresponding to the condition causing the interrupt, to execute the subroutine specified by the interrupt condition. The interrupts established are those for operation as a transmitter. If receiver operation is subsequently entered, other steps establish the receiver interrupt.

An example of an interrupt condition is a demand from the modem over the SERIAL CLOCK TRANSMIT (1.6) line that further data must be supplied over the SEND DATA (1.1) line in order to maintain channel data rate. Another example is an interrupt to provide processing of scanner and printer video signals. When such an interrupt occurs the control processor is immediately placed into a routine to handle the data demand. In order to satisfy these interrupt demands processor operation must of course be fast enough to have data to send or room to receive data, when necessary.

In most cases the interrupt conditions and associated routines thereby activated are not indicated in detail in the flow diagrams. Their operation and occurrence are well understood in the art and readily implemented in accordance with particular requirements of associated peripheral equipment.

Subsequent to establishing interrupt addresses, an initialization of variables operation 106 resets the control processor memory and establishes appropriate addresses, pointers and instructions for interrupts and other operations as is well understood in the art. The interrupts and variables established and initialized are, preferably, defined by instructions read in from tape reader 36 or card 39 as part of the program.

A decision 108 tests the REMOTE OPERATOR SWITCH line (8.1) and if activated in response to an operator request, sequencing branches to an S1.2 point which requires a decision 110 to test the DATA SET READY line (1.5) between the modem and the processor to determine if a call is in. If there is no call in opertion returns to the operation 104. If a call is in, the routine steps to an operation 112 which activates the REQUEST TO SEND line (1.2) and transmits the remote operator message through the modem as a preselected digital message which indicates to the remote station that voice communication is desired. From the termination of operation 112, operation 114 deactivates the "REQUEST TO SEND" line and returns to operation 104.

Assuming, in operation 108, that no requests for communication with the remote operator have been made, a decision 116 is made as to whether paper exists in the printer exposure station by sampling appropriate lines between the printer and control processor. If paper is detected, a flush print paper operation 118 is entered which activates the PRINT FLUSH (5.2) line and returns to the interrupt initiallizing operation 104. A test for a paper jam condition will normally be made at this point.

If the paper presence test results in a negative determination, a decision 120 is reached to test for the condition of an "interlock" which is any condition which results in the activation of lines 8.5 through 8.13 between the control processor and indicators and controls subsystem 32. If there is an interlock condition, indicating that the facsimile station may not be able to operate for a period of time, an operation 122 prevents a data call from being completed by appropriate signaling over the DATA TERMINAL READY line (1.4) between the control processor and modem and returns to decision 120. With no interlock condition, a decision 124 is made to test whether a document is present in the scanner by sampling the PAPER START line (2.6). If there is no document to indicate that the station is desirous of being a transmitter for sending a facsimile signal, a decision 126 is made by testing for activation of the DATA CARRIER DETECTED DELAYED line 1.11 indicating a transmit station is desirous of sending. If carrier is not present, the routine returns to operation 104, but if it is present proceeds to operation 128 which initiates the receive functioning indicated in FIGS. 2F through 2I. If during decision 124 a document is detected in the scanner, the routine branches to operation 130 which activates the transmit routines in FIGS. 2B–2E. At either this or a subsequent point before scanning a routining includes a step activating the LAMP OPERATE line (2.2).

Figure 2B:
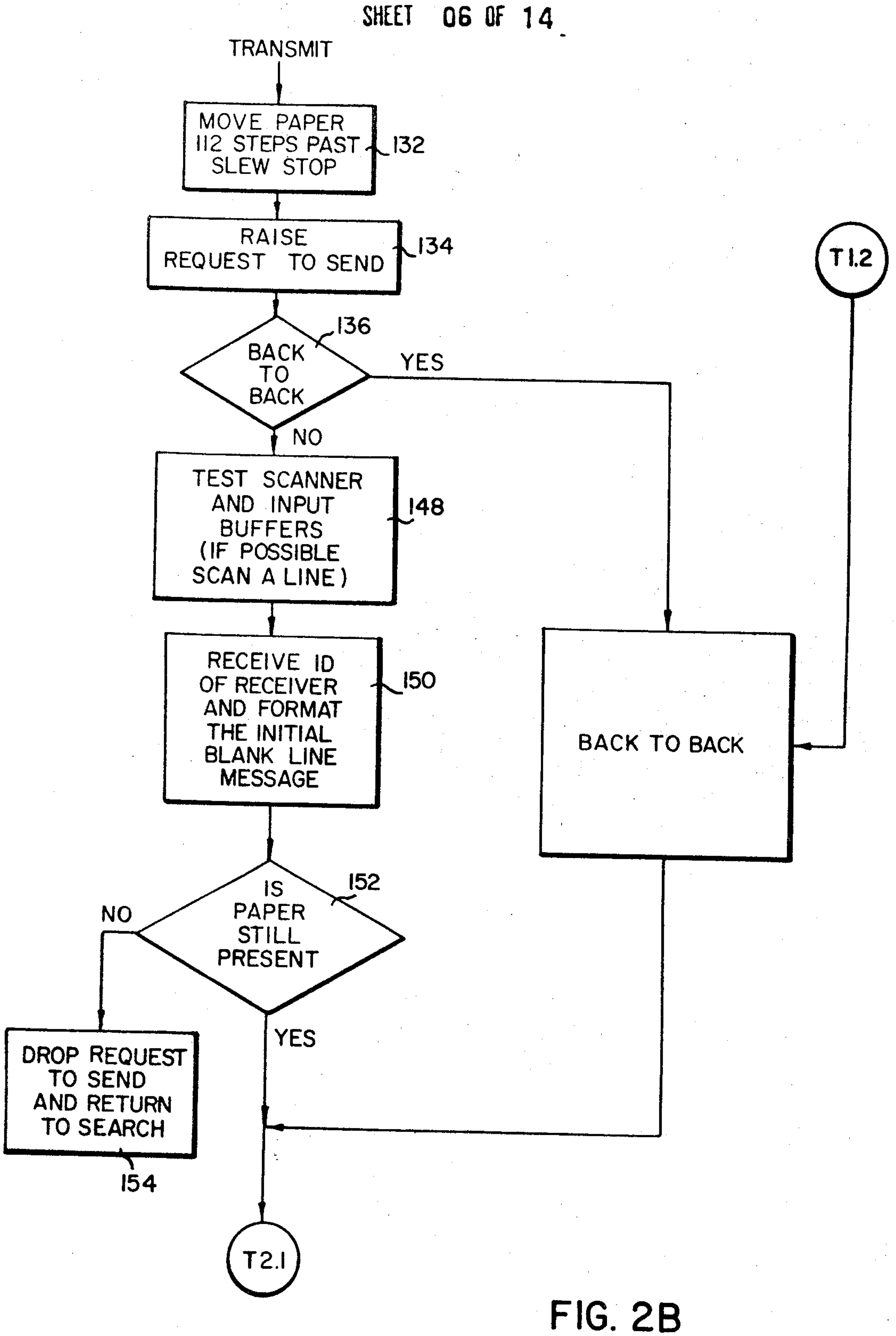

In the transmit mode, referring to FIG. 2B, initial operation 132 moves paper in the scanner a predetermined number of scan lines beyond the slew stop point to which paper entered into the scanner is automatically fed until the SLEW STOP line (2.7) is activated. Paper is inserted by the operator until caught by motor 43 in FIG. 1A when the FEEDER AUTO/MAN line is in the manual mode. In the automatic mode sheets may be fed from a paper stack by a feeder system not shown. The FORCE FEED line (2.5) is used to assist the operator in clearing a jammed document. After operation 132 a document is in position with its leading edge at or a set distance before the scan line point. Operation 134 subsequently activates the REQUEST TO SEND line (1.2) which establishes the forward transmission channel and provides a DATA CARRIER DETECTED DELAYED line (1.11) signal to the receiver. The modem 14 responds by activating the CLEAR TO SEND line (1.9) which causes the processor 16 to activate the TRANSMITTING line (8.15). The PULSE COUNTER line (5.3) is also activated to register "on" time. Subsequently a decision 136 is made as to whether a BACK TO BACK condition exists by sampling the BACK TO BACK line (2.4).

The BACK TO BACK condition provides for self-testing or diagnostic programmed operation of the facsimile station to produce a local copy of a locally fed document as a test of system operation.

While the BACK TO BACK condition may be detected and responded to as part of the indicated programming, it may alternatively be made a part of a separate program which is independently entered by a different tape or card and may include additional programming for specific diagnostic purposes. If a BACK TO BACK condition is determined to exist, sequencing branches to subsequently described operations and the BACK TO BACK indicator line (8.14) is activated.

If no BACK TO BACK condition is detected in decision 136, sequencing continues to an operation 148, which causes scanning of a line with generation of SCAN X SWEEP signal on line 3.1 if an input buffer is available within the control processor 16 and the scanner is not already in operation scanning a line. The SCAN GALVO SWEEP line (4.2) is activated and processor 16 receives scan signals over the SCAN DIGITAL VIDEO line 3.4 after being digitized by the video processor 61 from signals on the ANALOG VIDEO line (4.3). Cooperative page stepping signals are generated on lines 3.2, 3.3 and 4.1. This operation is preferably executed frequently at other points not explicitly indicated in the programming to insure a line is scanned as often as possible.

Subsequently sequencing proceeds to operation 150 where the processor looks for a receiver identification signal in the secondary channel in conjunction with the SECONDARY CARRIER ON and SECONDARY DATA RECEIVE lines 1.7 and 1.8. This signal is preferably a predetermined binary code, but does not ordinarily identify the receiver specifically. For this signal to be received, the REQUEST TO SEND signal generated in operation 134 must have been effective in establishing a forward channel to the receiver. After completing operation 150 a decision 152 is made by sampling control lines from the scanner to detect for the presence of paper. If none is detected the sequencing branches to an operation 154 that causes the REQUEST TO SEND signal to be terminated and the sequencing returned to the search point 100.

Figure 2C:
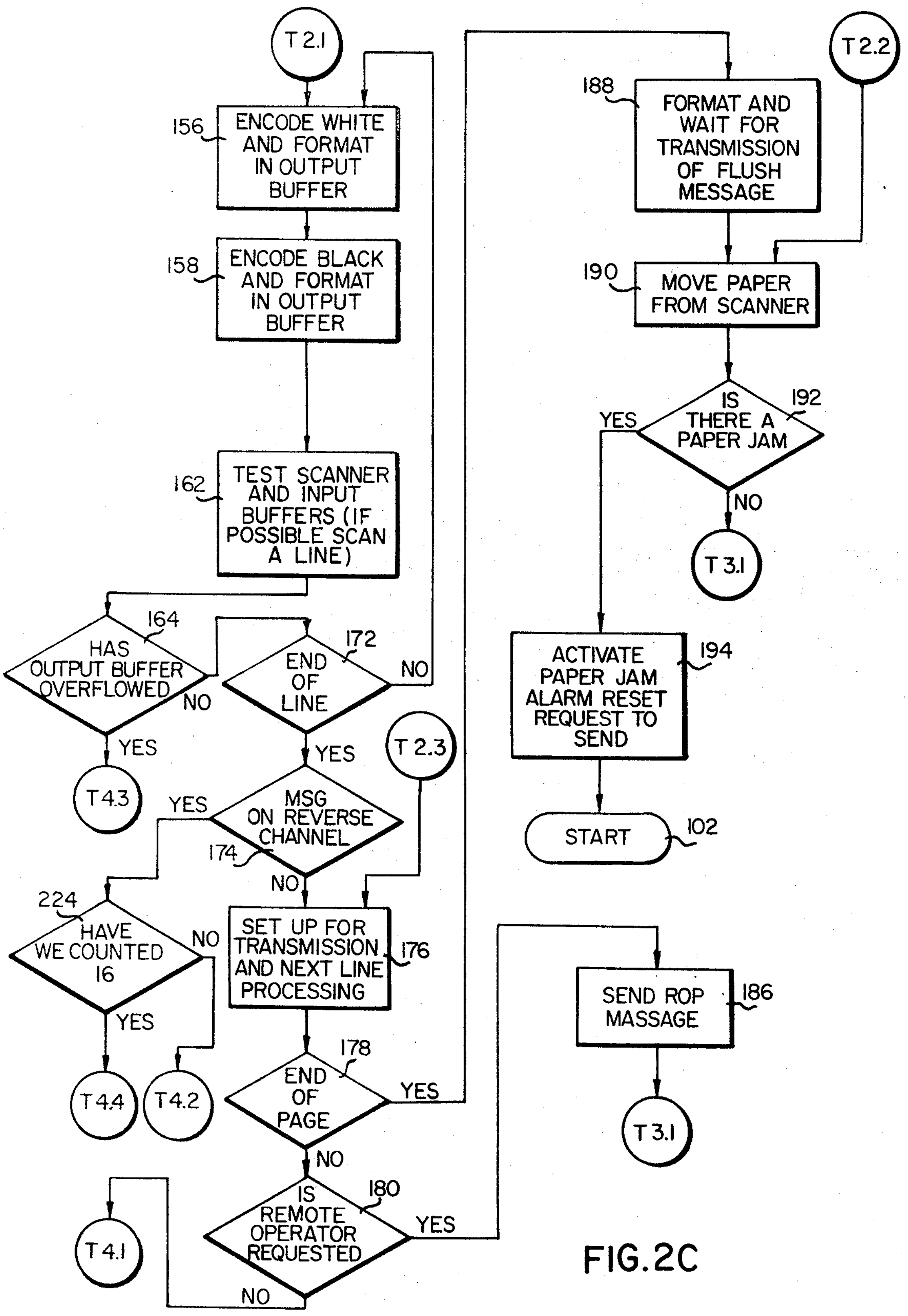

If paper is still present, the sequencing branches to the T2.1 point and line encoding which can be understood by reference to FIG. 2C. From the point T2.1 sequencing proceeds to an operation 156 which encodes the initial white representing portions of a line, preferably according to run length coding techniques, and places the code in the output buffer for transmission. Sequencing then proceeds to an operation 158 that encodes the subsequent black representing run length and again places it in an output storage buffer. A subsequent operation 162 tests the scanner and input buffers and if a buffer is available and the scanner not scanning a line already, it causes scanning of an additional scan line through activation of the SCAN X SWEEP line (3.1) as indicated above.

From operation 162 a decision 164 is made by detecting whether the output buffer has overflowed. If an overflow is detected, normally indicative of inappropriateness of the particular encoding technique employed for the line scanned, the sequence branches to a point T4.3 for operations indicated in FIG. 2E. From point T4.3, and operation 166 processes the line in uncoded form and proceeds to an operation 168 and decision 170 that cooperate to transfer input digital video received over the DIGITAL VIDEO line (3.4) out of an input buffer to an output buffer within the control processor for transmission. The decision 170 tests for the end of a line which is the termination of coding of all bits expected in a single line and when detected returns sequencing to point T2.3 in FIG. 2C.

Assuming that an output buffer overflow is not detected by decision 164, the sequence branches to a decision 172 in FIG. 2C to test for the end of coding of a line by completion of processing of a full buffer of scan line data. If negative sequencing returns to operation 156 for further run length encoding of the line. If end of line is detected, sequencing proceeds to a decision 174 which samples the SECONDARY CARRIER ON line (1.7) and if no message is indicated as ready for reception continues to an operation 176, to which point T2.3 also leads. Operation 176 provides internal preparation for transmission of coded data and scanning of the next line once data is ready for transmission. Then, if the CLEAR TO SEND signal, line 1.9, exists, data transmission is automatically executed over the SEND DATA line (1.1) by interrupt subroutines, not shown, in response to clocking signals from the SERIAL CLOCK TRANSMIT line (1.6). Subsequently a decision 178 tests for an end of page condition on the basis of internally detected numbers of SCAN Y STEP pulses on line 3.2 or, alternatively, a prolonged SUPER WHITE signal on line 3.5. If end of page condition is not detected, sequencing continues to a decision 180 that tests the REMOTE OPERATOR SWITCH line (8.1) and if no request is indicated, continues to a point T4.1 which is indicated on FIG. 2E. From point T4.1 sequencing leads to a decision 182 to test for a BACK TO BACK condition indicated on the BACK TO BACK line (2.4) and if not present proceeds to a decision 184 which detects whether a subsequent line can be started by testing for a buffer filled with a complete line of data and the other conditions to be satisfied as indicated above. If the determination is negative a loop is established repeating the test of decision 184 until the determination is positive when sequencing returns to point T2.1 for further line encoding.

If a BACK TO BACK condition is detected in decision 182, sequencing branches to operation 185 which prepares for line decoding and continues to a point R3.1 within the receiver portion of the processor routing.

Figure 2D:
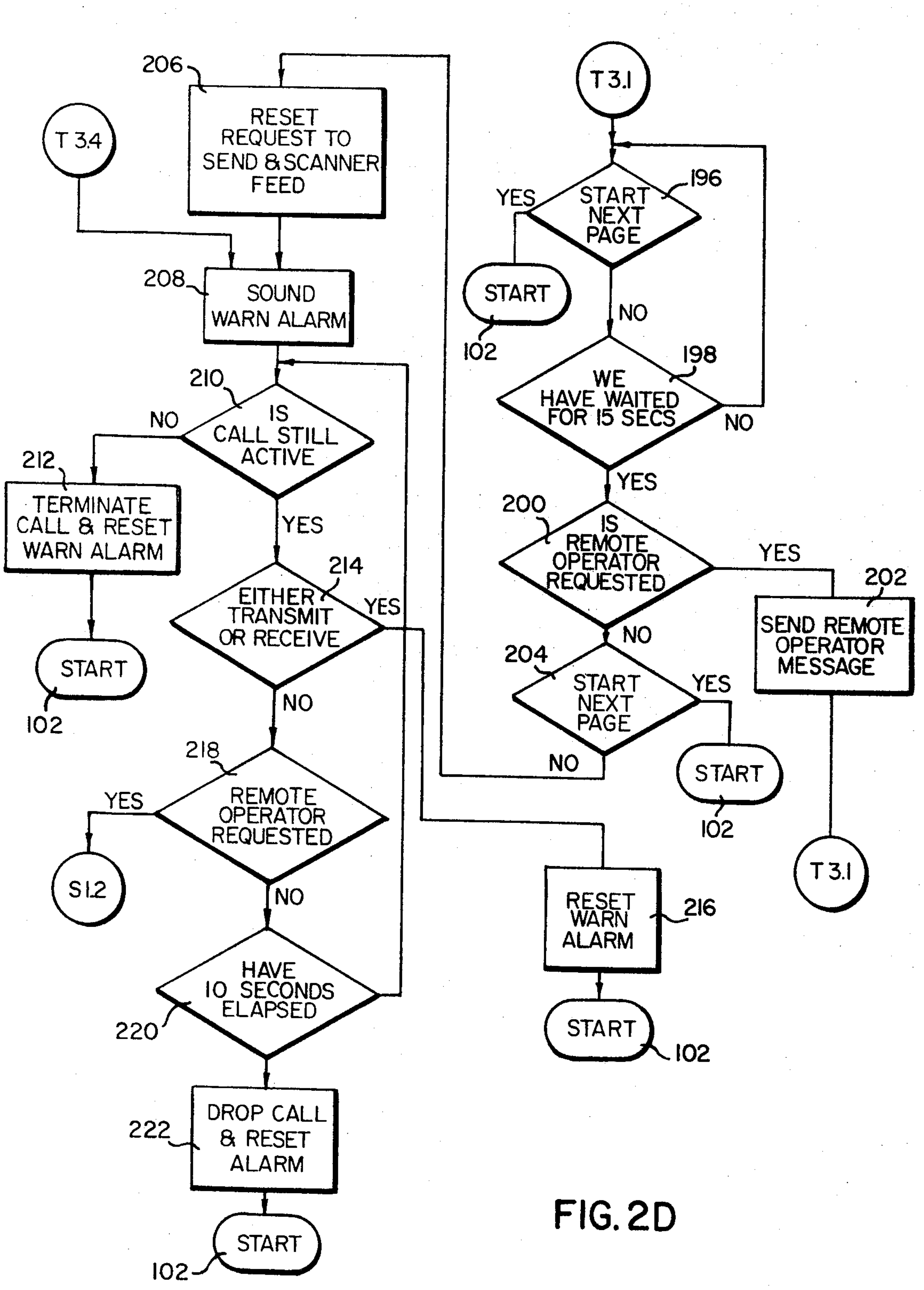
Figure 2E:
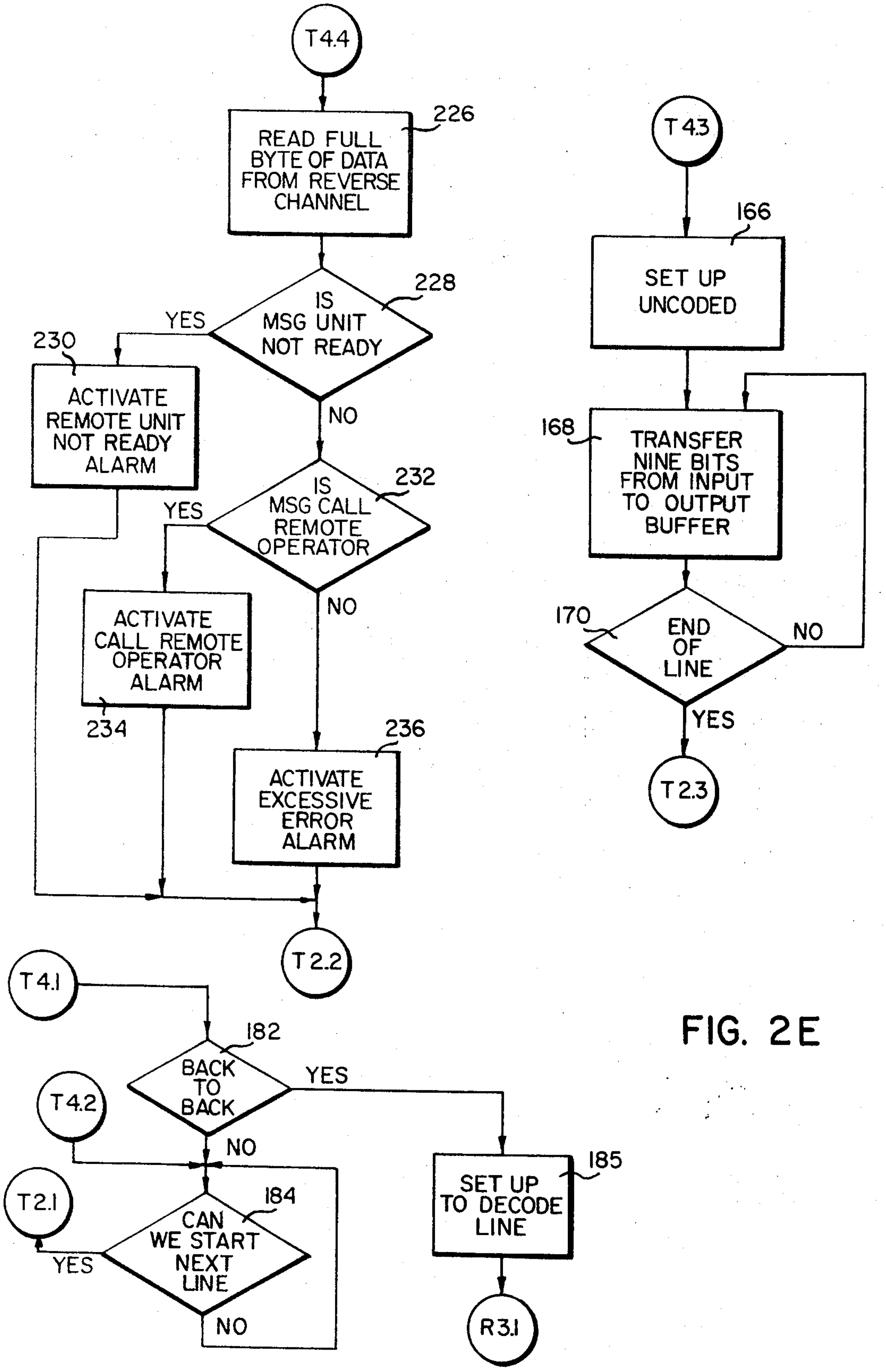

If the remote operator message has been requested to be sent and detected by decision 180, sequencing proceeds to an operation 186 for sending the remote operator message in an unambiguous code over the forward channel and continues to point T3.1 indicated on FIG. 2D.

If, during decision 178, end of page is detected, sequencing branches to an operation 188 which causes the generation and transmission of a FLUSH message over the SEND DATA line (1.1) for use by the receiver to cause printer paper exiting. A subsequent operation 190 causes the document in the scanner to be stepped out of the paper path with the SCAN Y STEP line (3.2). Subsequently a decision 192 is reached by sampling the SCANNER COPY EXIT line (2.8) to determine if a paper jam exists. If a paper jam is detected, an operation 194 activates the paper JAM alarm line 8.9 through the priority system after the KEY OPERATOR SWITCH line (8.2) is activated, and sequencing returns to start point 102. In all cases of activation of lines 8.6–8.13, the CALL KEY operator line (8.5) is also activated. When the key operator switch 91 is depressed the display 89 shifts to show the actual condition according to the priority chain presented above. These additional steps will not be explicitly mentioned hereafter. If no paper jam is detected, sequencing continues to point T3.1.

Referring to FIG. 2D the point T3.1 leads to a decision 196 of whether a new page can be started based upon detection of the page at slew stop, line 2.7, and if affirmative leads to the start position 102. If negative, a further decision 198 is reached which, by providing a negative determination loop back to decision 196, causes a 15 second delay. After 15 seconds, decision 198 leads to a decision 200 that tests for the requesting of a remote operator message and if requested is sent by operation 202 and sequencing is returned to the point T3.1. If no remote operator is requested, sequencing continues to a decision 204 that tests for the conditions for starting a new page. If existing it leads to start position 102 and if not existing it leads to an operation 206 which deactivates or resets the REQUEST TO SEND and SCANNER FEED lines (1.2 and 2.2).

Resetting the former initiates a call disconnect sequence in conjunction with the DATA TERMINAL READY line (1.4). Subsequently an operation 208 causes alarm 94 to sound and leads to a decision 210 which tests for whether the call is still active by sampling the DATA SET READY line (1.5) from the modem. If negative, it leads to an operation 212 to terminate the call and reset the alarm and proceed to the start position 102. If affirmative, it leads to a decision 214 which tests for the existence of either a transmit or receive condition by sampling the DATA CARRIER DETECTED DELAYED line (1.11) and PAPER START line (2.6). If affirmative sequencing goes to an operation 216 that resets the alarm 94 and leads to the start position 102, whereas if negative, sequencing leads to a remote operator test decision 218. If requested it leads to point S1.2 in FIG. 2A. If not requested decision 218 leads to a decision 220 testing for the lapsing of 10 seconds from entry thereto and providing a negative decision loop to the decision 210 until the 10 seconds have elapsed. After 10 second sequencing branches to an operation 222 for dropping the call and resetting the alarm 94 and returning to the start position 102.

Returning to the decision 174 in FIG. 2C, testing for the existence of a message on the secondary channel, if such a message is detected, sequencing branches to a further decision 224 which tests whether the reverse channel has had a message in sixteen passes through decision 174. If there have not been sixteen detections of the message, sequencing branches to a point T4.2 which leads into the decision 184 in FIG. 2E. If the predetermined count has been detected sequencing branches to a point T4.4 in FIG. 2E which leads to an operation 226 that reads a predetermined quantity of data from the secondary channel over the SECONDARY DATA RECEIVE LINE (1.8). If the message indicates the remote or receiving station is in a not ready condition in accordance with a decision 228, branching is to an operation 230 to activate the REMOTE UNIT NOT READY line (8.13) and alarm 94, and the CALL KEY OPERATOR line (8.2) sequencing branches then to the point T2.2 which leads into the operation 190.

If the REMOTE UNIT NOT READY message is not detected, a decision 232 is made to determine if the message is CALL REMOTE OPERATOR. If affirmative, an operation 234 causes activation of that line (8.4) and leads to the point T2.2. If the CALL REMOTE OPERATOR message is not detected, processing continues to an operation 236, but activates the EXCESSIVE ERROR line (8.11) and continues to point T2.2.

Figure 2F:
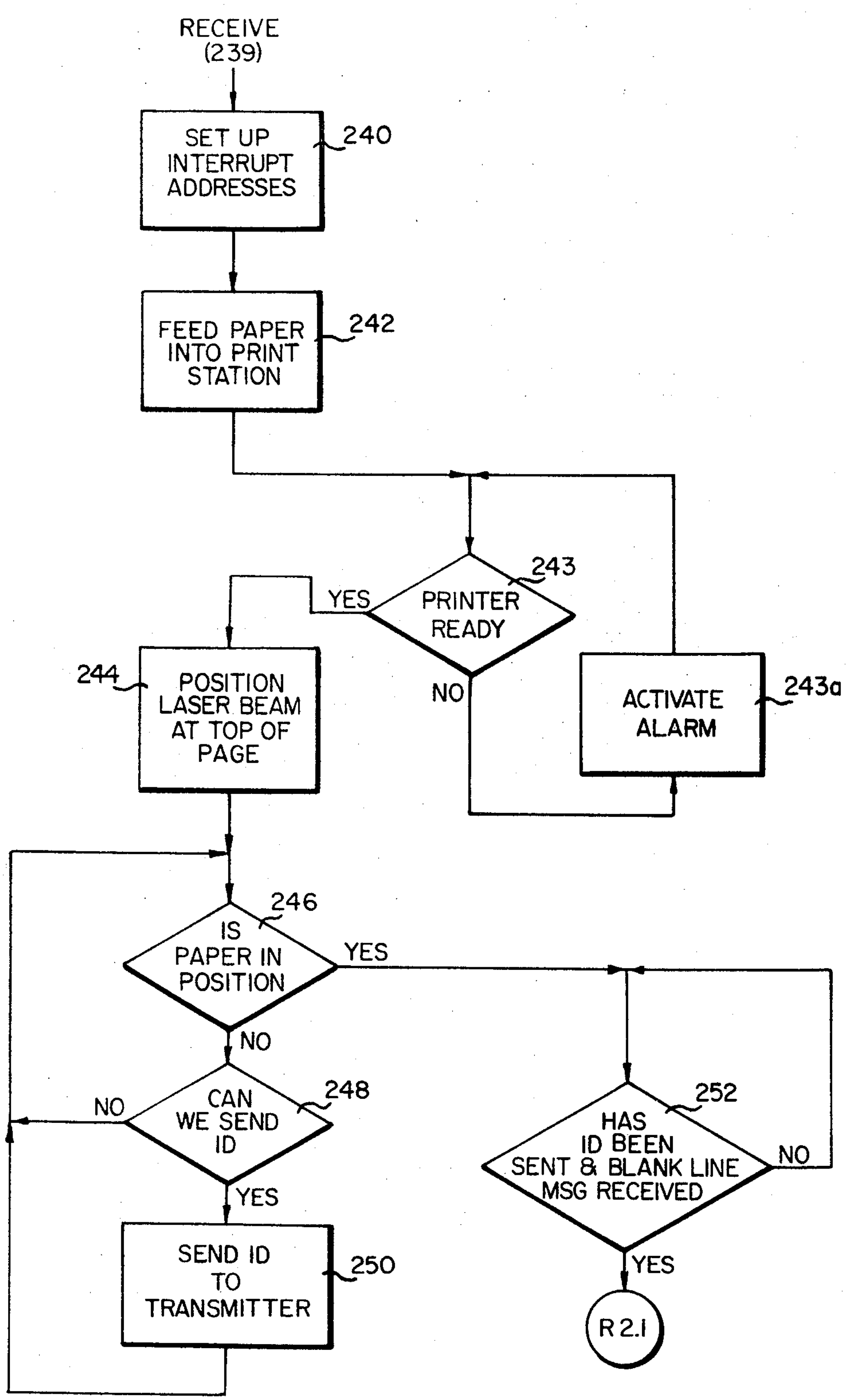
Figure 2G:
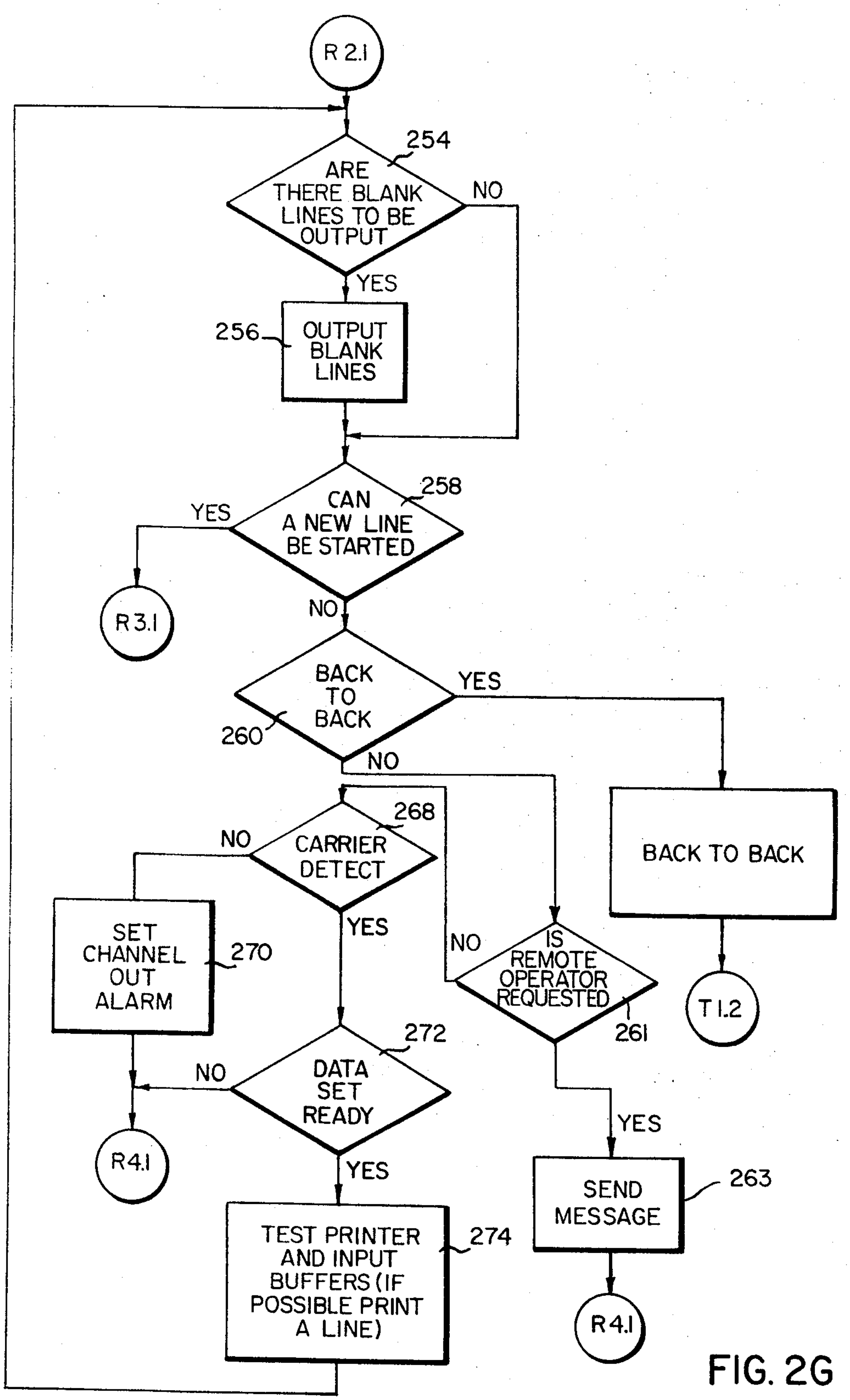

The above indicates the operation of a transmit sequence according to stored program functioning of the control processor 16. Turning to FIG. 2F the stored program operation in the receive mode is indicated in that and the subsequent three figures.

Turning now to FIG. 2F the initial portion of the receive algorithm is indicated as entered from the operation 128 in FIG. 2A. From receive position 239, an operation 240 is performed to set up receive mode interrupt addresses in a manner similar to the operations 104 and 106 in FIG. 2A. Subsequently an operation 242 causes paper to be fed into the print station by activation of the PRINT FEED line (5.1) and deactivates the PRINT Y RESET line (6.3). This operation leads to a printer status check of the PRINTER READY, DEVELOPER LOW, and PAPER OUT lines (5.4, 5.7, and 5.8). The latter two, if active, cause activation of respective lines (8.7 and 8.6) DEVELOPER LOW and PAPER OUT. The PRINTER READY line has a negative indication if either of the latter two are active or the paper door switch 72*a* in FIG. 1B is closed as determined by OR gate 72. If the not ready status of this line (5.4) exists and the other lines (5.6 and 5.7) are not active, a door open condition is indicated, and the PAPER DOOR OPEN line (8.8) is activated. If the PRINTER READY line indicates a not ready status, check 243 loops with itself and alarm step 243*a* until rectified or a specified time elapses, returning control to search 100. Subsequently an operation 244 positions the laser beam at the top beginning edge of the paper by appropriate activation of the PRINT X SWEEP and PRINT Y INCREMENT lines (6.1 and 6.2). A succeeding decision 246 tests the READY TO PRINT line (5.6) to check for the proper positioning of paper. This decision will be negative at least once causing a further decision 248 to be made testing whether the receiver's identification can be sent to the transmitter on the secondary channel by testing the SECONDARY CLEAR TO SEND line (1.13) for secondary channel availability. If the decision is negative the control processor sits in a loop encompassing decisions 246 and 248 until the secondary channel is available at which point an operation 250 is executed sending the receivers identification to the transmitter on the SECONDARY DATA TRANSMIT line (1.3) and returning control to decision 246.

When decision 246 is affirmative sequencing proceeds to a decision 252 testing for whether the receivers identification signal has been sent and an initial blank line message (at least one of which is sent according to coding) has been received from the transmitter on the RECEIVE DATA line (1.12) through clock signals on the SERIAL CLOCK RECEIVE line (1.10). The decision 252 is looped until an affirmative decision is reached at which point processing switches to point R2.1 in FIG. 2G. From point R2.1 a decision 254 is made by detecting whether predetermined codes indicative of one or more blank scan lines have been received and stored in the control processor and if the decision is affirmative operation 256 causes outputting of the blank lines and corresponding increment pulses to be supplied to the PRINT Y INCREMENT line (6.2). If the decision 254 is negative sequencing switches immediately to decision 258 following operation 256, and tests whether a new line can be started. If affirmative, sequencing branches to point R3.1 on FIG. 2H but if negative continues on to a decision 260 which tests for a BACK TO BACK condition. If BACK TO BACK is detected sequencing continues with diagnostic operations described below and returns to point T1.2.

If the BACK TO BACK decision 260 is negative, the receiver routining continues to a decision 261 which tests for a remote operator request, and if positive proceeds to an operation 263 sending it and continuing at point R4.1. If negative, decision 261 leads to decision 268 which tests for the presence of a signal on the DATA CARRIER DETECTED DELAYED line (1.11). If this decision is negative, an operation 270 activates the CHANNEL OUT line (8.10), alarm 94 and CALL KEY OEPRATOR line (8.5) and continues to a point R4.1 on FIG. 2I. If the decision 268 is affirmative, the PULSE COUNTER line (5.3) is activated to record running time in the printer, the RECEIVING line 8.16 is activated and processing continues to decision 272 sampling the DATA SET READY line (1.5) for an indication of whether the modem is operational. If negative, processing continues to point R4.1 but if positive branches to operation 274 which tests to ascertain if the laser is positioned to mark a new line and if the control processor output buffer storage is full, if these conditions are met a line is printed by feeding the square wave PRINT X SWEEP line (6.1) signal clocking the output buffer data to the laser assembly 28 at a rate to reproduce the scan line in proper scale. The print analog circuits as indicated above generate the corresponding PRINT GALVO SWEEP line (7.2) and PRINT Y GALVO line (7.1) signals as indicated above. Subsequently the PRINT Y INCREMENT line (6.2) pulse is sent to the print analog circuits 26. In any event sequencing returns to point R2.1. A test to print a line is made repeatedly in the receive mode for reasons similar to the testing for scanning of a line.

Figure 2H:
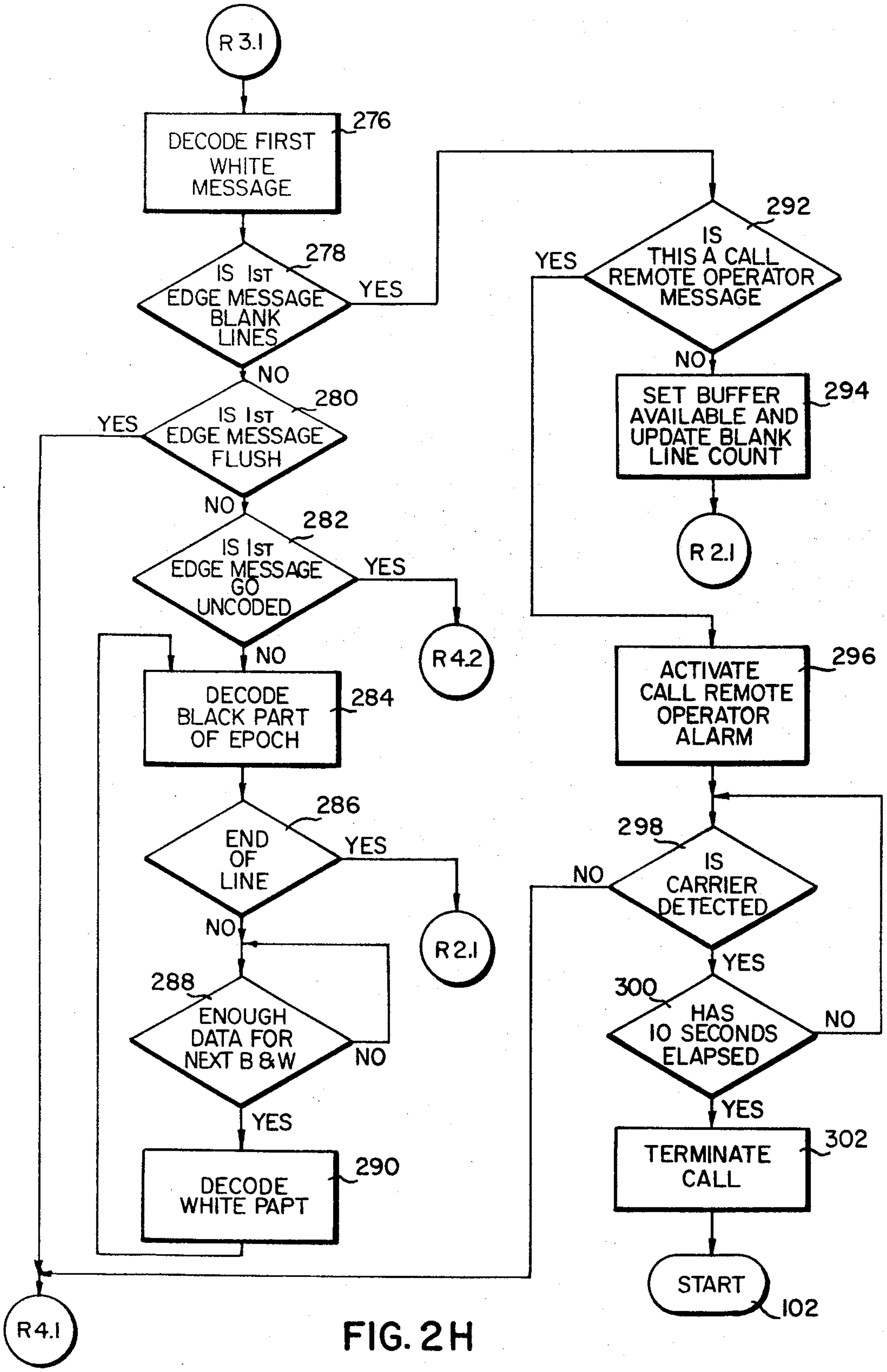
Figure 21:
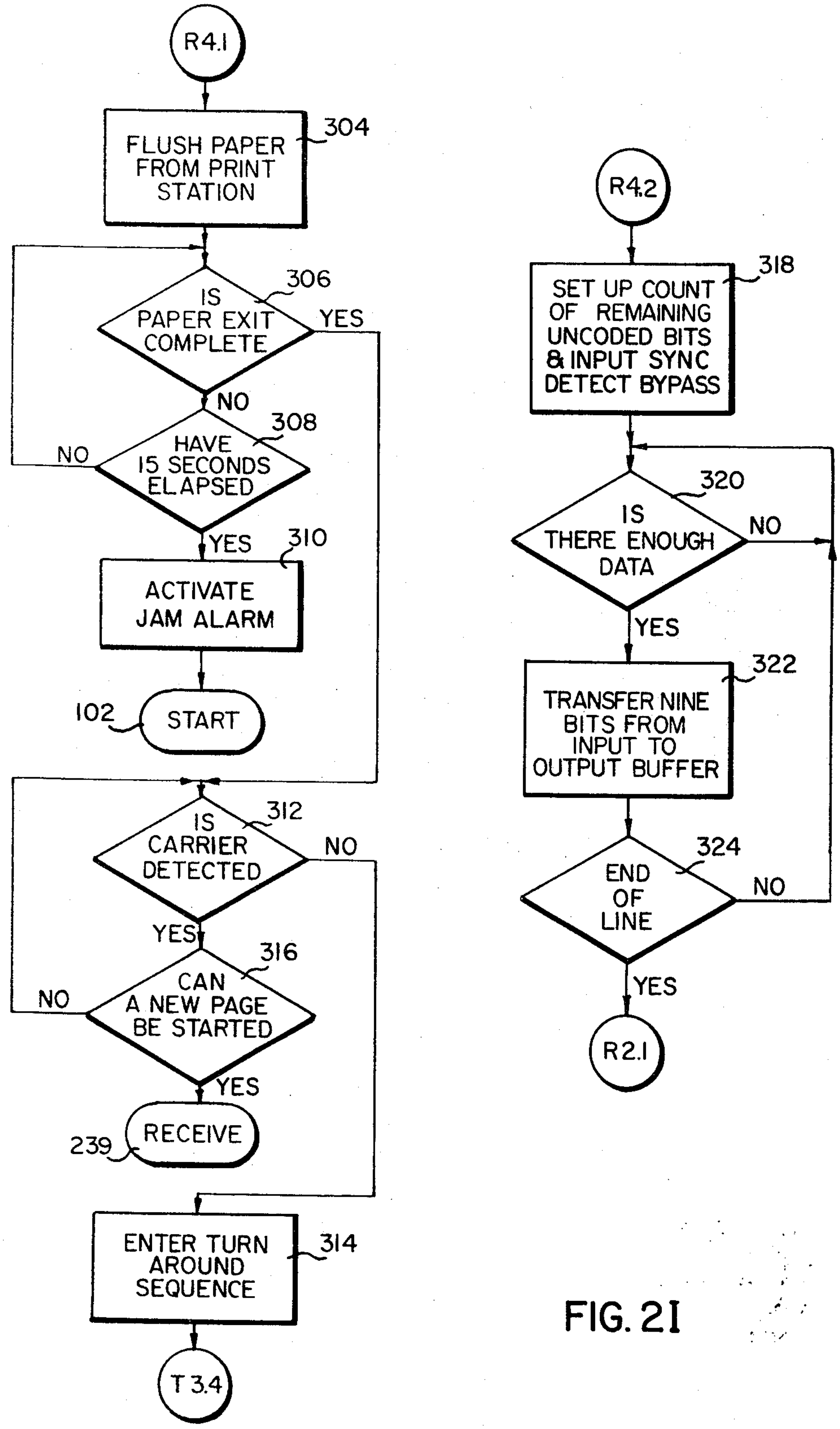

Assuming that the decision 258 was affirmative and that branching switched to point R3.1 on FIG. 2H the programming sequence continues to a decision 276 for decoding of the first white run length and proceeds to a decision 278 testing whether that message indicates blank lines. If the decision is negative a further decision 280 tests whether the first message is a FLUSH message. If affirmative programming branches to point R4.1 in FIG. 2I, but if negative continues to decision 282 which tests whether the first message indicates whether the line is being transmitted uncoded. If affirmative routining branches to point R4.2 on FIG. 2I, but if negative continues to an operation 284 which decodes the subsequent message indicating the next, and black run length of the scan line. From operation 284 decision 286 is made testing whether the line is terminated on the basis of counted bits in the line at the receiver and if affirmative branches to point R2.1. If the end of line test 286 is negative programming continues to a decision 288 testing whether there is enough received data in the control processor for another complete sequence of adjacent white and black single run lengths. If the decision is negative, a loop is formed with the decision 288 until the answer is affirmative at which point an operation 290 decodes a white run length of the next sequence and continues to operation 284 for decoding the black part.

Returning to decision 278 and assuming that it was affirmatively made, a further decision 292 is made testing whether the first message includes a CALL REMOTE OPERATOR message. If negative, control branches to an operation 294 which resets the input buffers within the processor since no line data is necessary and augments the count of blank lines by 1. Programming returns to points R2.1. If decision 292 is affirmative sequencing continues to operation 296 activating the REMOTE OPERATOR line (8.4) in the indicators and controls subsystem 32. Subsequently, a decision 298 checks for the presence of carrier by sampling the DATA CARRIER DETECTED DELAYED line (1.11). If the decision is negative sequencing branches to point R4.1 in FIG. 2I but if affirmative continues to decision 300 which tests an internal 10 second delay in a loop with decision 298 and after 10 seconds branches to operation 302 which terminates the call by interrupting activation of the DATA TERMINAL READY line (1.4) for a specified period of time and returning sequencing to start point 102.

An affirmative determination in decision 280 or a negative termination in decision 298 leads to the point R4.1 in FIG. 2I. A subsequent operation 304 flushes paper from the print station by activation of the PRINT FLUSH line (5.2). A subsequent decision 306 tests for completion of paper exit by sampling PRINT COPY EXIT line (5.5). If paper has not exited a decision 308 is made testing for the running of a 15 second interval in a loop with the decision 306 which, once elapsed, proceeds to operation 310 activating the JAM line (8.9) and returning sequencing to start position 102. If during this 15 second interval paper exit is detected sequencing branches to decision 312 which again detects for the presence of carrier. If negative it results in operation 314 entering a "turn-around sequence" in which the receiver becomes a transmitter and routining continues into the transmitter subroutine at point T3.4. If decision 312 is affirmative sequencing continues to decision 316 which tests, among other conditions, for received data commanding paper feeding and the presence of the DATA CARRIER DETECTED DELAYED signal (1.11) to indicate if a new page can be started. If affirmative control proceeds back to FIG. 2F to the initial position 239 in the receive routine. If decision 316 is negative a loop is formed with decision 312 until either decisions 312 or 316 alter.

If the decision 282 in FIG. 2H was affirmative meaning the first message indicated is to go uncoded sequencing branches to point R4.2 in FIG. 2I and initiates operation 318 that detects the run length in uncoded format and bypasses the detection of line starting codes. Subsequently a decision 320 is made as to whether there is sufficient data for printing a predetermined portion of a scan line and if negative sits in a loop with decision 320 until an affirmative decision is made. At this point an operation 322 is entered transferring a predetermined number of bits to the output buffer and causing printing of a predetermined portion of line. A subsequent decision 324 tests the count of bits in the line for end of line indication and if negative returns to decision 320, but if positive switches to point R2.1.

When the above indicated algorithm is suitably programmed, entered on tape (or read only memory card), inserted into the tape reader 36 (or socket 40) and used to program the control processor 16 for the indicated operation, the control processor will be conditioned to operate as a facsimile transceiver in association with the peripheral units of FIG. 1. The transceiver will then be compatible with other facsimile stations whose operation is the same as that prescribed by the programming of the control processor 16. Importantly, the sequencing of FIGS. 2A–2I can be changed in any desired way to accommodate the operation of different facsimile stations in their coding technique or supervisory and control functioning. Similarly, different sequencing can be programmed into the control processor 16 to alter the nature of operations required by the human operator attending the facsimile transceiver without altering the signal sequencing presented by the control processor to the remote facsimile transcriber.

Figure 3:
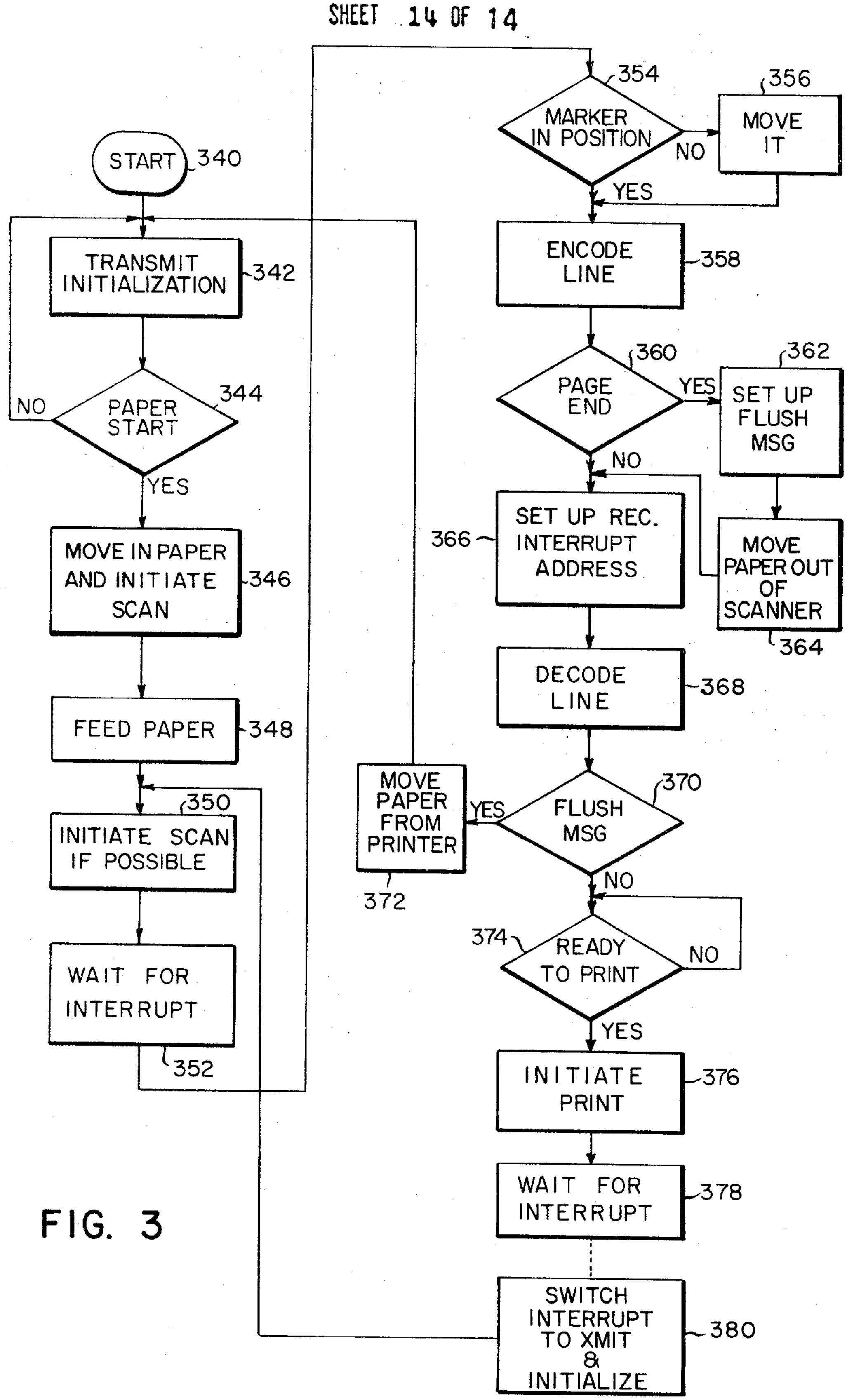
FIG. 3 is a flow chart indicative of stored program facsimile operation in accordance with diagnostic program instructions.

In FIG. 3 a generalized flow chart is presented of the programming steps to be used in diagnostic operation of the facsimile station of FIG. 1 in response to a separate card 39 or tape 37. The operations and decisions indicated in FIG. 3 are in generalized form without relation to the specific detailed operations and lines sampled or signalled that were indicated in describing FIGS. 2A–2I, those details being readily supplied by one skilled in the art in view of the FIGS. 2A–2I disclosure.

With reference to FIG. 3, system stored program operation is initiated from a start position 340. Subsequently an initialization operation 342 is entered analogous to the operations 104 and 106 in FIG. 2A, and a decision 344 is made testing the PAPER START line (2.6) for the presence of a paper to be transmitted, or in the case of the diagnostic routine, to be reproduced locally. If decision 344 is negative processing returns to operation 342; but if positive, it moves to an operation 346 which feeds paper to a position for scanning and initiates scanning by the scanner 18 in FIG. 1. Subsequently a paper feed operation 348 places the printer 24 from FIG. 1 in condition to print with charged paper in place for copy reproduction. An operation 350 initiates scanning of a line if the input buffers are empty and the scanner is not already in operation on a line. A subsequent operation 352 causes an interrupt delay to handle the scanning operation and the data produced thereby. The interrupt operation 352 returns to a decision 354 which tests whether the laser beam is positioned for marking from the top edge of a page and, if not in position, branches to an operation 356 which positions it and leads to a subsequent operation 358, causing a line of scanned data to be encoded. If decision 354 was positive operation 358 is automatically entered. From operation 358 a decision 360 tests for end of page conditions as indicated above. If the test indicates the end of the page then operation 362 causes a FLUSH message to be generated which in turn causes the print paper to leave the print station. A subsequent operation 364 causes paper in the scanner station to be moved out of the scanner 18.

An operation 366 initializes the control processor for the receive and print operations and is entered by a negative determination from decision 360 normally or from the scan paper exit operation 364. Subsequent to the initialization 366, an operation 368 cycles through the subroutines necessary to decode a line and leads to a decision 370 testing whether a FLUSH message has been generated and if positive in its decision leads to an operation 372 that exists paper from the printer and returns to the transmit initialization 342. If decision 370 is negative, indicating a FLUSH message was not generated, processing continues to a decision 374 which tests for ready to print conditions and provides a loop with itself if the decision is negative, but if positive leads to an operation 376 which initiates printing by the printer 24 and leads to an operation 378 which causes a printer interrupt condition, stalling the processor until the printing has been executed and then continues to an operation 380 which reinitializes the control processor for the transmit operation and returns sequencing to the initiate scan operation 350.

As indicated above when end of page condition is detected processing is ultimately returned to operation 342 and decision 344 which are connected in a loop testing for the presence of paper in the scanner. If after a predetermined time interval no paper is present and detected, a predetermined shut-down of the operation will be entered. The facsimile station will then return to an idle or search mode.

The above described sequencing for diagnostic facsimile station operation causes an individual facsimile station in response to that stored program to scan a document and produce a facsimile of the same document at that station. A comparison of the printed copy with the original document readily reveals system operating characteristics or faults, particularly when a diagnostic document is supplied and has predetermined indicia to test most or all of the machine operations with the exception of those involving the modem 14 in FIG. 1. As indicated above, the diagnostic routine may be made a part of a normal operating program and entered in response to an operator activated switch. In separate form the diagnostic routine may include additional subroutining to provide a more detailed check of system operation.

Having described above preferred embodiments of the invention, it will occur to those skilled in the art that various alterations and modifications can be made to the disclosed structure while at the same time practicing the spirit of the invention. It is accordingly intended to limit the scope of the invention only as indicated in the following claims.

What is claimed is:

1. A stored program facsimile control system operative in accord with one of a plurality of selectable program instruction sets and comprising at a facsimile station:

a document scanner system operative in response to control signals to scan a document and to produce video signals representative of document indicia along scan lines thereof;

a facsimile printer system operative in response to control signals to trace scan lines across a copy and simultaneously operative in response to video signals representative of document indicia to mark said copy with a facsimile copy of said document indicia;

a stored program control processor;

a plurality of program instruction sets for use by said processor;

each of said plurality of instruction sets providing different operation of said processor;

means for applying one of said plurality of selectable program instruction sets to said stored program control processor to adapt said processor to operation in accordance with characteristics of said scanner and printer;

said stored program control processor being operative in response to the applied program instruction set to provide control signals to said scanner and printer systems;

said control processor being further operative in response to said applied program instruction set for selectively receiving said video signals from said scanner system and for selectively applying video signals to said printer system for producing said document copy.

2. The stored program facsimile control system of claim 1 wherein said plurality of selectable program instruction sets further include:

a plurality of different coding instructions for processing and deprocessing said video signals for efficient data transmission thereof;

a data channel; and one or more control program instruction sets operative to provide compatibility in the signals conveyed by said data channel between said facsimile station and different, remote scanner and printer systems.

3. The stored program facsimile control system of claim 1 wherein said plurality of selectable program instruction sets include a diagnostic program instruction set operative to cause said control processor to provide scanning of said document and printing of a corresponding document copy at said facsimile station.

4. The stored program facsimile control system of claim 1 further including:

indicating means for indicating a plurality of predetermined conditions;

one or more of said plurality of applied program instruction sets including instructions for causing said control processor to detect one or more of said plurality of conditions;

said control processor being operative in response to one such program instruction set to respond to a detected condition; and means operative to cause an indication of said plurality of conditions responded to one at a time according to a predetermined priority.

5. A stored program facsimile control system operative in accordance with a selectively applied program instruction set and comprising:

a scanner having:

means for detecting the presence of a document to be scanned in position for commencing scanning of said document;

means for scanning elemental areas of said document in adjacent scan lines;

means for detecting indicia in scanned elemental areas and operative to provide a scan signal;

a data channel operative to transmit data to a remote unit; and a plurality of program instruction sets, each adapted to provide different operation of said system;

a stored program control processor operative in response to a selectively applied one of said program instruction sets:

to receive an indication of the detection of the presence of a document from said scanner;

to cause said scanning means to scan one or more scan lines in response to reception of said indication;

to receive the scan signal resulting from the scanning of one or more scan lines of said document; and to apply said scan signal to said data channel.

6. The stored program facsimile control system according to claim 5 further including:

indicator means for providing an indication of one or more conditions;

said control processor being operative to detect the existence of predetermined conditions in said scanner; and to activate said indicator means to provide an indication of detected scanner conditions;

means associated with said data channel for conveying data from said remote unit;

said control processor being further operative to receive said data from said remote unit over said data channel and to activate said indicator means to provide an indication of the nature of predetermined messages in said received data; and means for providing a predetermined priority in the activation of said indicator means.

7. The stored program facsimile control system according to claim 6 wherein:

means are provided for conveying separate documents within said scanner along a path including said position for commencing scanning;

means are provided to detect placement of said document at a point for conveying within said scanner; and said control processor is further operative in response to said program instruction set:

to cause activation of said conveying means in response to detection of the placement of a document at the point for conveying and operative to convey said document to said position for commencing scanning before causing scanning thereof;

to detect completion of scanning of said document;

to convey said document from said scanner in response to detection of completion of scanning;

to detect failure of said document to be conveyed from said scanner; and to provide a signal to said indicator means to indicate the condition of failure of said document to exit from said scanner.

8. A stored program facsimile control system operative in accordance with a selectively applied program instruction set and comprising:

a printer having:

a copy station for positioning a copy sheet for reproducing a document;

means for selectively marking elemental areas on said copy sheet at said copy station;

means for advancing the position of the selectively marked elemental areas across said copy sheet in adjacent scan lines;

a data channel in communication with a remote unit;

a plurality of program instruction sets, each adapted to provide different operation of said system;

a stored program control processor operating in response to an applied one of said program instruction sets:

to receive data from said data channel;

to cause said position advancing means to scan one or more scan lines on said copy sheet in response to said received data; and to cause selective marking of elemental areas on said copy sheet by said marking means in response to said received data.

9. The stored program facsimile control system of claim 8 wherein said stored program control processor is operative in response to said selectively applied program instruction set to decode data received from said data channel according to one of a set of data decoding instructions.

10. The stored program facsimile control system according to claim 8 wherein:

said control processor has means for temporary storing of data received from said data channel; and said control processor is operative in response to said instruction set to detect when said position advancing means are not being caused to scan one or more adjacent scan lines of said copy sheet and when the data in said temporary storing means indicates storage of a predetermined quantity of data and in response to detection thereof to cause said selective marking means and said position advancing means to operate to produce lines of selectively marked elemental areas on said copy sheet in response to said predetermined quantity of data in said temporary storing means.

11. The stored program facsimile control system of claim 8 including condition indicating means for providing an indication of predetermined conditions within said facsimile control system according to a preset priority.

12. The stored program facsimile control system of claim 11 wherein:

said control processor is operative in response to said program instruction set to detect a malfunction condition in said data channel; and said condition indicating means is operative to respond to the detected malfunction of said data channel and produce an indication of said malfunction condition.

13. A stored program facsimile control system comprising:

scanning means for producing a video signal representing indicia in a document along adjacent scan lines on said document in response to control signals and including:

means for conveying a document along a scan path in said scanning means in response to said control signals;

means for detecting an operator desire to transmit document indicia;

means for detecting the exiting of a document from said scan path; and means for detecting the presence of a document at a point of initial scanning in said scan path;

printing means for marking a copy sheet along adjacent scan lines in response to video and control signals to produce a document copy and including:

means for detecting operability of said printing means;

means for detecting positioning of a copy sheet in said printing means to commence marking of said copy sheet along adjacent scan lines in response to said printing means video and control signals;

means for conveying a copy sheet in said printing means along a path including the position for commencing marking in response to said printing means control signals; and means for detecting exiting of said copy sheet along said path from said printing means;

condition indicating means operative in response to one or more signals of a condition signal set to provide an indication of the condition represented by the one or more signals of said condition signal set in a preset priority;

a plurality of program instruction sets, each adapted to provide a different operation of said system;

a stored program control processor operative in response to a selectively applied one of said program instruction sets, said control processor being interconnected with said scanning, printing, and condition indicating means to receive and apply respective video, control, and condition signals therefrom and thereto to control scanning of a document, printing of a copy sheet, and indication of one or more conditions; and a data channel operating to send and receive signals representative of data to a remote unit having one set of characteristics from a plurality of sets of characteristics, said data channel including:

means for receiving data signals from said control processor for transmission over said data channel;

means for indicating to said control processor when data may be received for transmission;

means for applying signals received from said remote unit to said control processor;

means for receiving from said control processor an indication of system operativeness for transmission of data to said remote station; and means for applying a signal providing an indication of remote unit operativeness from said data channel to said control processor;

said control processor being operative in response to said stored program instruction set:

to test for detection of said operator desire to transmit indicia and, if detected, to commence operation of said processor in accordance with a transmit instruction subset; and to test for application from said data channel of said remote unit operativeness signal and to commence operation of said processor in accordance with a receive instruction subset in response thereto;

said control processor being operative in said transmit instruction subset to cause said scanning means to scan adjacent scan lines on said document and produce a corresponding video signal and to cause data processing of said video signal and application thereof to said data channel for transmission to said remote unit;

said control processor being operative in response to said receive instruction subset to accept signals applied thereto from said data channel and to cause said printing means to mark sequential scan lines on said copy sheet in response to the accepted signal from said data set;

said control processor being further operative in response to said program instruction set to detect the existence of one or more predetermined conditions in said facsimile control system and to provide corresponding one or more signals of said condition signal set to said condition indicating means.

14. The stored program facsimile control system according to claim 13 wherein:

the one or more predetermined conditions of said facsimile control system detected by said control processor include, at appropriate times, detection of the exiting of said document from said scanning means and of said copy sheet from said printing means, detection of the operability of said printing means, detection of a malfunction in said data channel, detection of nonoperativeness of said remote unit, and detection of predetermined numbers of prohibited data states in said video signal; and said detected conditions are indicated one at a time according to a predetermined priority.

15. The stored program facsimile control system according to claim 13 wherein:

said condition indicating means includes means for indicating to said control processor a request for direct operator communications between said remote unit and said facsimile control system and said control processor is operative in response thereto to apply data to said data channel representative of said request; and said control processor is operative to detect as one of said predetermined conditions, receipt of data from said data channel indicating a request from said remote unit for direct operator communication and to apply a corresponding condition indicating signal to said condition indicating means for display by said condition indicating means.

16. The stored program facsimile control system of claim 13 wherein said control processor is operative in response to said receive program instruction subset:

to detect exiting of paper from said printing means;

to detect the lack of a signal from said data channel as applied to said control processor to indicate remote unit operativeness; and in response to detected exiting and lack of a remote unit operativeness signal to recommence an initial instruction subset for determining whether said control processor is to enter a receive or transmit instruction subset.

17. A stored program facsimile control system comprising:

a document scanning system operative to produce a video signal representative of document indicia in a plurality of spaced, adjacent scan lines and including:

means for sensing document indicia in elemental areas;

means for causing the sensed elemental area to scan across said document; and means for incrementally advancing the line of scanned elemental areas on said document;

a copy printing system operative in response to a video signal representative of document indicia to produce a document copy and including:

means for selectively marking elemental areas of indicia on a document copy;

means for scanning the position of marked elemental areas in scan lines across said document copy;

means for advancing said scan lines of marked elemental areas along said document;

a data channel in communication with a remote station;

a plurality of stored program instruction sets, each adapted to provide different operation of said system;

a stored program control processor having a plurality of interconnections with said data channel, said document scanning system and said facsimile printing system and operative in response to a selectively applied one of said program instruction sets wherein:

said control processor is selectively caused to provide signals to said document scanning system to produce adjacent line scanning of indicia on a document and to receive said video signal representative of sensed indicia;

said control processor is selectively caused to mark elemental areas in adjacent scan lines across a document copy in response to a video signal representative of sensed document indicia; and said control processor is caused to send and receive signals representative of document indicia over said data channel.

18. The stored program facsimile control system of claim 17 further including:

means for detecting and indicating an alarm condition; and means for resetting said alarm indicating means in response to signals from said data channel indicating a different placing of a call from said remote station.

19. A method of facsimile system operation according to stored program control instructions including the steps of:

selecting one of a plurality of different stored program instruction sets for selected system operation in accordance with system characteristics;

testing a document scanner by the operation of the selected stored program to determine whether said scanner is in a condition to scan said document;

testing a processor by said selected stored program operation to determine whether said processor is in condition to receive scan signals representative of scanned document indicia;

causing programmed scanning by said scanner of predetermined numbers of elemental areas on said document in adjacent scan lines in response to said scanner being found in condition to scan and said processor in condition to receive;

detecting indicia in the scanned elemental areas of said document and generating said scan signal therefrom;

causing said processor by the selected programmed instructions to receive and store said scan signal;

detecting when a data channel is available to receive data for transmission to a remote unit; and responding to detected data channel availability by a programmed interrupt to cause said stored scan signal to be applied as data to said data channel.

20. A method of facsimile system operation according to stored program control instructions including the steps of:

selecting one of a plurality of different stored program instruction sets for selected system operation in accordance with system characteristics;

detecting indications from a data channel that data is available for receipt by a processor;

responding to a detected indication with stored program interrupt instructions in said selected set to receive and store data from said data channel;

testing a printer by stored program instructions in said selected set to determine whether said printer is in a condition to respond to scan and control signals to selectively mark elemental areas in adjacent scan lines on a copy sheet;

detecting when the stored, received data reaches a predetermined quantity of stored data; and producing by programmed instruction in said selected set said scan and control signals from said predetermined quantity of stored data when said printer is in condition to respond to cause said selective marking of predetermined numbers of elemental areas on said copy sheet.

* * * * *